United States Patent
Seymore et al.

(10) Patent No.: US 11,580,693 B1
(45) Date of Patent: *Feb. 14, 2023

(54) TWO-DIMENSIONAL IMAGE COLLECTION FOR THREE-DIMENSIONAL BODY COMPOSITION MODELING

(71) Applicant: Amazon Technologies, Inc., Seattle, WA (US)

(72) Inventors: David Lawrence Seymore, Seattle, WA (US); Prakash Ramu, Portland, OR (US); Aneeb Qureshi, Seattle, WA (US); Ita Lifshitz, Kiryat Ono (IL); Anta Imata Safo, Seattle, WA (US); Megan Heffernan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,658

(22) Filed: Jan. 21, 2022

Related U.S. Application Data

(63) Continuation of application No. 16/557,830, filed on Aug. 30, 2019, now Pat. No. 11,232,629.

(51) Int. Cl.
*G06T 17/00* (2006.01)
*G06T 7/70* (2017.01)
(Continued)

(52) U.S. Cl.
CPC ............. *G06T 17/00* (2013.01); *G06T 7/536* (2017.01); *G06T 7/62* (2017.01); *G06T 7/70* (2017.01);
(Continued)

(58) Field of Classification Search
None
See application file for complete search history.

(56) References Cited

U.S. PATENT DOCUMENTS 6,188,925 B1   2/2001   Kawanishi et al.
6,468,209 B1  10/2002   Heymsfield et al.
(Continued)

FOREIGN PATENT DOCUMENTS

CA   2884668 A1    9/2016
CN   106295205 A   1/2017
CN   110051353 A   7/2019

OTHER PUBLICATIONS

Anguelov, D., Srinivasan, P., Koller, D., Thrun, S., Rodgers, J. and Davis, J., "SCAPE: Shape Completion and Animation of People," ACM Trans. Graph. (Proc. SIGGRAPH), 24(3):408-416, Jul. 2005, 9 pages, http://robots.stanford.edu/papers/anguelov.shapecomp.pdf.

(Continued)

*Primary Examiner* — Yanna Wu
(74) *Attorney, Agent, or Firm* — Athorus, PLLC

(57) ABSTRACT

Described are systems and method directed to generation of a dimensionally accurate three-dimensional ("3D") body model of a body, such as a human body, based on two-dimensional ("2D") images of that body. A user may use a 2D camera, such as a digital camera typically included in many of today's portable devices (e.g., cell phones, tablets, laptops, etc.) and obtain a series of 2D body images of their body from different directions with respect to the camera. The 2D body images may then be used to generate a plurality of predicted body parameters corresponding to the body represented in the 2D body images. Those predicted body parameters may then be further processed to generate a dimensionally accurate 3D model of the body of the user.

20 Claims, 16 Drawing Sheets

(51) Int. Cl.
  *G06T 7/00* (2017.01)
  *G06T 7/62* (2017.01)
  *G06T 15/04* (2011.01)
  *G06T 7/536* (2017.01)
  *G06T 19/20* (2011.01)
  *H04N 5/235* (2006.01)

(52) U.S. Cl.
  CPC ............... *G06T 7/97* (2017.01); *G06T 15/04* (2013.01); *G06T 19/20* (2013.01); *G06T 2207/20084* (2013.01); *G06T 2207/30196* (2013.01); *H04N 5/2351* (2013.01); *H04N 5/2353* (2013.01)

(56) References Cited

U.S. PATENT DOCUMENTS

| | | |
|---|---|---|
| 8,918,162 B2 | 12/2014 | Prokoski |
| 8,982,147 B2 | 3/2015 | Ramani et al. |
| 9,801,550 B2 | 10/2017 | Ferrantelli |
| 9,839,376 B1 | 12/2017 | Ross et al. |
| 10,321,728 B1 | 6/2019 | Koh et al. |
| 10,489,683 B1 | 11/2019 | Koh et al. |
| 10,559,111 B2 | 2/2020 | Sachs et al. |
| 10,657,709 B2 | 5/2020 | Moore et al. |
| 10,748,217 B1 | 8/2020 | Ross et al. |
| 10,796,480 B2 | 10/2020 | Chen et al. |
| 10,945,813 B2 | 3/2021 | Li et al. |
| 2004/0151366 A1 | 8/2004 | Nefian et al. |
| 2013/0230211 A1* | 9/2013 | Tanabiki ............... G06V 40/23 382/103 |
| 2013/0325493 A1 | 12/2013 | Wong et al. |
| 2014/0121564 A1 | 5/2014 | Raskin |
| 2014/0340479 A1 | 11/2014 | Moore et al. |
| 2016/0247017 A1 | 8/2016 | Sareen et al. |
| 2016/0284123 A1* | 9/2016 | Hare ................... G06V 40/167 |
| 2018/0089821 A1 | 3/2018 | Koldyshev |
| 2019/0122424 A1* | 4/2019 | Moore .................... G06N 7/00 |
| 2019/0191137 A1 | 6/2019 | Bisti |
| 2019/0347817 A1 | 11/2019 | Ferrantelli et al. |
| 2020/0193710 A1 | 6/2020 | Talgorn et al. |
| 2020/0302621 A1* | 9/2020 | Kong ..................... G06T 7/215 |
| 2020/0319015 A1 | 10/2020 | Kamiyama et al. |

OTHER PUBLICATIONS

Anonymous: "BMI 3D", www.bmi3d.de; Nov. 25, 2018 (Nov. 25, 2018), XP002801424, URL: https://web.archive.org/web/20181125231845/https://www.bmi3d.de/rechner.html [Retrieved from the Internet on Dec. 16, 2020]; the whole document.

Anonymous: "Documentation: What is MakeHuman?", MakeHuman, May 20, 2016 (May 20, 2016), XP002801426, URL: http://www.makehumancommunity.org/wiki/Documentation:What is MakeHuman%3F [Retrieved from the Internet on Jan. 30, 2021]; the whole document.

Anonymous: "Virtual Weight Loss Simulator", www.changeinseconds.com; Dec. 11, 2016 (Dec. 11, 2016), XP002801425, URL: https://web.archive.org/web/20161206202928;%20/http://www.changeinseconds.com/simulator/ [Retrieved from the Internet on Dec. 16, 2020]; the whole document.

Balan, A. O. and Black, M. J., "The Naked Truth: Estimating Body Shape under Clothing," In European Conference on Computer Vision (ECCV), 2008, 15 pages, https://www.researchgate.net/profile/Michael_Black6/publication/221305001_The_Naked_Truth_Estimating_Body_Shape_Under_Clothing/links/0fcfd512d21f538458000000/The-Naked-Truth-Estimating-Body-Shape-Under-Clothing.pdf?origin=publication_detail.

Bălan, A. O., Sigal, L., Black, M. J., Davis, J. E. and Haussecker, H. W., "Detailed Human Shape and Pose from Images," In IEEE Conference on Computer Vision and Pattern Recognition (CVPR), 2007, 9 pages.

Bogo, F., Kanazawa, A., Lassner, C., Gehler, P., Romero, J. and Black, M. J., "Keep it SMPL: Automatic Estimation of 3D Human Pose and Shape from a Single Image," In European Conference on Computer Vision (ECCV), 2016, 21 pages, https://arxiv.org/pdf/1607.08128v1.pdf.

Boisvert, J., Shu, C., Wuhrer, S., and Xi, P., "Three-Dimensional Human Shape Inference from Silhouettes: Reconstruction and Validation," Machine Vision and Applications, 24(1):145-157, 2013, 13 pages, http://people.scs.carleton.ca/~c_shu/Publications/silhouettes_human_rec_MVA11.pdf.

Bukar et al., "Automatic age and gender classification using supervised appearance model," Journal of Electronic Imaging, Aug. 2016; 25(6):0601605, 12 pages.

Chen, W., Wang, H., Li, Y., Su, H., Wang, Z., Tu, C., Lischinski, D., Cohen-Or, D. and Chen, B. Synthesizing Training Images for Boosting Human 3D Pose Estimation. In 2016 Fourth International Conference on 3D Vision (3DV) Oct. 25, 2016 (pp. 479-488). IEEE, 10 pages.

Chen, X., Guo, Y., Zhou, B. and Zhao, Q., "Deformable Model for Estimating Clothing and Naked Human Shapes from a Single Image," The Visual Computer, 29(11):1187-1196, 2013, 10 pages.

Chen, Y., Kim, T.-K. and Cipolla, R., "Inferring 3D Shapes and Deformations from Single Views," In European Conference on Computer Vision, 2010, 14 pages.

Chen, Y., Kim, T.-K. and Cipolla, R., Silhouette-Based Object Phenotype Recognition Using 3D Shape Priors. In Inter-national Conference on Computer Vision (ICCV), 2011, 8 pages.

Devries, T. and Taylor, G. W., Learning Confidence for Out-of-Distribution Detection in Neural Networks, arXiv preprint arXiv:1802.04865, 2018, 12 pages.

Dibra, E., Jain, H., Öztireli, C., Ziegler, R. and Gross, M., "HSNets: Estimating Human Body Shape from Silhouettes with Convolutional Neural Networks," In International Conference on 3D Vision (3DV), 2016, 10 pages.

Dibra, E., Jain, H., Öztireli, C., Ziegler, R. and Gross, M., "Human Shape from Silhouettes Using Generative HKS Descriptors and Cross-Modal Neural Networks," In IEEE Conference on Computer Vision and Pattern Recognition (CVPR), 2017, 11 pages.

Dibra, E., Jain, H., Öztireli, C., Ziegler, R. and Gross, M., "Shape from Selfies: Human Body Shape Estimation Using CCA Regression Forests," In European Converence on Computer Vision (ECCV), 2016, 17 pages.

Gilbert, A., Volino, M., Collomosse, J. and Hilton, A.,"Volumetric Performance Capture from Minimal Camera View-Points," In European Conference on Computer Vision, 2018, 16 pages.

Gong, K., Liang, X., Zhang, D., Shen, X. and Lin, L., "Look into Person: Self-Supervised Structure-Sensitive Learning and a New Benchmark for Human Parsing," In IEEE Conference on Computer Vision and Pattern Recognition (CVPR), 2017, 9 pages.

Guan, P., Weiss, A., Bălan, A. O. and Black, M. J., "Estimating Human Shape and Pose from a Single Image," In IEEE International Conference on Computer Vision (ICCV), 2009, 8 pages.

Güler, R. A., Neverova, N. and Kokkinos, I., "DensePose: Dense Human Pose Estimation in the Wild," In IEEE Conference on Computer Vision and Pattern Recognition (CVPR), 2018, 10 pages.

He, K., Zhang, X., Ren, S. and Sun, J., "Deep Residual Learning for Image Recognition," In IEEE Conference on Computer Vision and Pattern Recognition (CVPR), 2016, 10 pages.

Hirano, D., Funayama, Y. and Maekawa, T. 3D Shape Reconstruction From 2D Images. Computer-Aided Design and Applications. 2009 CAD Solutions, LLC. Jan. 1, 2009 ;6(5):701-10, 10 pages.

Horprasert, T., Harwood, D. and Davis, L. S., "A Statistical Approach for Real-Time Robust Background Subtraction and Shadow Detection," In IEEE International Conference on Computer Vision (ICCV), 1999, 19 pages.

Joo, H., Simon, T. and Y. Sheikh, Y., "Total Capture: A 3D Deformation Model for Tracking Faces, Hands, and Bodies," In IEEE Conference on Computer Vision and Pattern Recognition (CVPR), 2018, 10 pages.

Kanazawa, A., Black, M. J., Jacobs, D. W. and Malik, J., "End-to-End Recovery of Human Shape and Pose," In IEEE Conference on Computer Vision and Pattern Recognition (CVPR), 2018, 10 pages.

(56) References Cited

OTHER PUBLICATIONS

Krasin, I., Duerig, T., Alldrin, N., Ferrari, V., Abu-El-Haija, S., Kuznetsova, A., Rom, H., Uijlings, J., Popov, S., Kamali, S., Malloci, M., Pont-Tuset, J., Veit, A., Belongie, S., Gomes, V., Gupta, A., Sun, C., Chechik, G., Cai, D., Feng, Z., Narayanan, D., and Murphy, K., "Openimages: A Public Dataset for Large-Scale Multi-Label and Multi-Class Image Classification," Dataset available from https://storage.googleapis.com/openimages/web/index.html, 2017.

Kundu, A., Li, Y. and Rehg, J. M., "3D-RCNN: Instance-Level 3D Object Reconstruction via Render-and-Compare," In IEEE Conference on Computer Vision and Pattern Recognition (CVPR), 2018, 10 pages.

Lassner, C., Romero, J., Kiefel, M., Bogo, F., Black, M. J. and Gehler, P. V., "Unite the People—Closing the Loop Between 3D and 2D Human Representations," In IEEE Conference on Computer Vision and Pattern Recognition (CVPR), 2017, 10 pages.

Li, K., R. Garg, M. Cai and I. Reid, "Single-view Object Shape Reconstruction Using Deep Shape Prior and Silhouette," The School of Computer Science, University of Adelaide and Australian Centre for Robotic Vision. Adelaide, Australia, arXiv preprint arXiv: 1811.11921. Aug. 1, 2019, Cornell University, URL: https://arxiv.org/pdf/1811.11921.pdf, 14 pages.

Long, J., Shelhamer, E., and Darrell, T., "Fully Convolutional Networks for Semantic Segmentation, "In IEEE Conference on Computer Vision and Pattern Recognition (CVPR), 2015, 10 pages.

Loper, M., Mahmood, N., Romero, J., Pons-Moll, G. and Black, M. J., "SMPL: A Skinned Multi-Person Linear Model," ACM Trans. Graphics (Proc. SIGGRAPH Asia), 34(6):248:1-248:16, Oct. 2015, 16 pages.

Mülayim, A. Y., Yilmaz, U. and Atalay, V. Silhouette-based 3D Model Reconstruction from Multiple Images. IEEE Transactions on Systems, Man, and Cybernetics, Part B (Cybernetics). Jul. 22, 2003;33(4):582-91, 27 pages.

nakedlabs.com, Aug. 2, 2018 (Aug. 2, 2018), XP002801423, URL: https://web.archive.org/web/20180802014000/https://nakedlabs.com/ [Retrieved from the Internet: Dec. 16, 2020]; the whole document.

Ngiam, J., Khosla, A., Kim, M., Nam, J., Lee, H.and Ng, A. Y., "Multimodal Deep Learning," In International Conference on Machine Learning (ICML), pp. 689-696, 2011, 8 pages.

Nguyen et al., "Gender Recognition from Human-Body Images Using Visible-Light and Thermal Camera Videos Based on a Convolutional Neural Network for Image Feature Extraction," Sensors,Mar. 2017:17(3);637, 22 pages.

Omran, M., Lassner, C., Pons-Moll, G., Gehler, P. V. and Schiele, B., "Neural Body Fitting: Unifying Deep Learning and Model-Based Human Pose and Shape Estimation," In International Conference on 3D Vision (3DV), 2018, 14 pages.

Park, S., Hwang, J. and Kwak, N. 3D Human Pose Estimation Using Convolutional Neural Networks with 2D Pose Information. In European Conference on Computer Vision, Sep. 8, 2016 (pp. 156-169), https://arxiv.org/pdf/1608.03075v2.pdf, 15 pages.

Pavlakos et al., "Expressive Body Capture: 3D Hands, Face, and Body from a Single Image," 2019 IEEE/CVF Conference on Computer Vision and Pattern Recognition (CVPR), Jun. 1, 2019, 11 pages.

Pavlakos, G., Zhu, L., Zhou, X. and Daniilidis, K., "Learning to Estimate 3D Human Pose and Shape from a Single Color Image," In IEEE Conference on Computer Vision and Pattern Recognition (CVPR), 2018, 10 pages.

Popa, A.-I., Zanfir, M. and C. Sminchisescu, C., "Deep Multitask Architecture for Integrated 2D and 3D Human Sensing," In IEEE Conference on Computer Vision and Pattern Recognition (CVPR), 2017, 10 pages.

Rhodin, H., Robertini, N., Casas, D., Richardt, C., Seidel, H.-P. and Theobalt, C., "General Automatic Human Shape and Motion Capture Using Volumetric Contour Cues," In European Conference on Computer Vision, 2016, 18 pages.

Robinette, K. M., Blackwell, S., Daanen, H., Boehmer, M., Fleming, S., Brill, T., Hoeferlin, D. and Burnsides, D., "Civilian American and European Surface Anthropometry Resource (CAESAR) Final Report," Tech. Rep. AFRL-HEWP-TR-2002-0169, US Air Force Research Laboratory, 2002, 70 pages.

Rogez, G., Weinzaepfel, P. and Schmid C. LCR-Net++: Multi-Person 2D and 3D Pose Detection in Natural Images. IEEE IEEE Transactions on Pattern Analysis and Machine Intelligence, Jan. 14, 2019;42(5): 1146-61, Downloaded on Jul. 18, 2020, 16 pages.

Sigal, L., Bălan, A. O. and Black, M. J., "Combined Discriminative and Generative Articulated Pose and Non-Rigid Shape Estimation," In Neural Information Processing Systems (NIPS), 2007, 8 pages.

Su et al., "Multi-view Convolutional Neural Networks for 3D Shape Recognition," 2015 IEEE International Conference on Computer Vision (ICCV), Dec. 7-13, 2015, Santiago, Chile, 9 pages.

Sun, J., Ovsjanikov, M. and Guibas, L., "A Concise and Provably Informative Multi-Scale Signature Based on Heat Diffusion," In Symposium on Geometry Processing, 2009, 10 pages.

Sun, X., Wu, J., Zhang, X., Zhang, Z., Zhang, C., Xue, T., Tenenbaum, J. B. and Freeman, W. T. Pix3D: Dataset and Methods for Single-Image 3D Shape Modeling. In 2018 IEEE/CVF Conference on Computer Vision and Pattern Recognition, Jun. 18, 2018 (pp. 2974-2983). IEEE, 10 pages.

Tan, J. K. V., Budvytis, I. and Cipolla, R., "Indirect Deep Structured Learning for 3D Human Body Shape and Pose Prediction," In British Machine Vision Conference, 2017, 11 pages.

TC2 Labs LLC, "SizeUSA", 3 pages, http://scan2fit.com/sizeusa/about.php.

Tome, D., Russell, C. and Agapito, L. Lifting from the Deep: Convolutional 3D Pose Estimation from a Single Image. In Proceedings of the IEEE Conference on Computer Vision and Pattern Recognition 2017 (pp. 2500-2509), 11 pages.

Varol, G., Ceylan, D., Russell, B., Yang, J., Yumer, E., Laptev, I. and Schmid, C., "BodyNet: Volumetric Inference of 3D Human Body Shapes," In European Conference on Computer Vision (ECCV), 2018, 17 pages.

Varol, G., Romero, J., Martin, X., Mahmood, N., Black, M. J., Laptev, I. and Schmid, C., "Learning from Synthetic Humans," In IEEE Conference on Computer Vision and Pattern Recognition (CVPR), 2017, 9 pages.

Wiles, Olivia and Andrew Zisserman, "SilNet: Single- and Multi-View Reconstruction by Learning from Silhouettes," Visual Geometry Group, Department of Engineering Science, University of Oxford, Oxford, UK, arXiv preprint arXiv: 1711.07888. Nov. 21, 2017, Cornell University, URL: https://arxiv.org/pdf/1711.07888.pdf, 13 pages.

Xi, P., Lee, W.-S. and Shu, C., "A Data-Driven Approach to Human-Body Cloning Using a Segmented Body Database," In Pacific Conference on Computer Graphics and Applications (PG), 2007, 9 pages.

Xie, H., Yao, H., Sun, X., Zhou, S. and Zhang, S. Pix2Vox: Context-aware 3D Reconstruction from Single and Multi-view Images. arXiv preprint arXiv: 1901.11153, https://arxiv.org/pdf/1901.11153.pdf, Jul. 29, 2019, 9 pages.

Yu, F., Zhang, Y., Song, S., Seff, A., and Xiao, J., "LSUN: Construction of a Large-Scale Image Dataset Using Deep Learning with Humans in the Loop," arXiv preprint arXiv:1506.03365, 2015, 9 pages.

Zanfir, A., Marinoiu, E. and Sminchisescu, C., "Monocular 3D Pose and Shape Estimation of Multiple People in Natural Scenes—the Importance of Multiple Scene Constraints," In IEEE Conference on Computer Vision and Pattern Recognition (CVPR), 2018, 10 pages.

Zhang, H., Dana, K., Shi, J., Zhang, Z., Wang, X., Tyagi, A. and Agrawal, A., "Context Encoding for Semantic Segmentation," In The IEEE Conference on Computer Vision and Pattern Recognition (CVPR), Jun. 2018, 10 pages.

Zhu, R., H. Kiani Galoogahi, C. Wang and S. Lucey, "Rethinking Reprojection: Closing the Loop for Pose-aware Shape Reconstruction from a Single Image," The Robotics Institute, Carnegie Mellon University, In Proceedings of the IEEE International Conference on Computer Vision, Jul. 26, 2017 (pp. 57-65), 9 pages.

* cited by examiner

TWO-DIMENSIONAL IMAGE COLLECTION FOR THREE-DIMENSIONAL BODY COMPOSITION MODELING

PRIORITY CLAIM

This application is a Continuation of U.S. patent application Ser. No. 16/557,830, filed Aug. 30, 2019, and titled "Two-Dimensional Image Collection For Three-Dimensional Body Composition Modeling," the contents of which are herein incorporated by reference in their entirety.

BACKGROUND

Three-dimensional modeling of the human body currently requires large or expensive sensors, such as stereo imaging elements, three-dimensional scanners, depth sensing devices, etc.

DETAILED DESCRIPTION

As is set forth in greater detail below, implementations of the present disclosure are directed to the collection of two-dimensional ("2D") body images of a body of a user, generation, and presentation of a dimensionally accurate three-dimensional ("3D") body model of the body of the user based on those 2D body images. For example, an application executing on a portable device that includes a 2D camera, such as cell phones, tablets, laptops, etc., may provide instructions to a user and collect 2D body images of a body of the user from different body directions. Those 2D body images may be sent by the application to remote computing resources that process the 2D body images to determine body measurements and to generate a 3D body model of the body of the user. Body measurements include, but are not limited to, body composition (e.g., weight, visual body fat, bone mass, body mass, body volume, etc.) and body dimensions (e.g., arm length, leg length, arm circumference, leg circumference, shoulder width, shoulder circumference, waist width, waist circumference, torso width, torso circumference, body height, etc.)

The application executing on the portable device receives the body measurement information and 3D body model parameters, generates the 3D body model, and presents some or all of the body measurements and the 3D body model to the user. The user may interact with the 3D body model to view different sides of the 3D body model and/or to visualize differences in the 3D body model if one or more body measurements change.

Figure 1A:
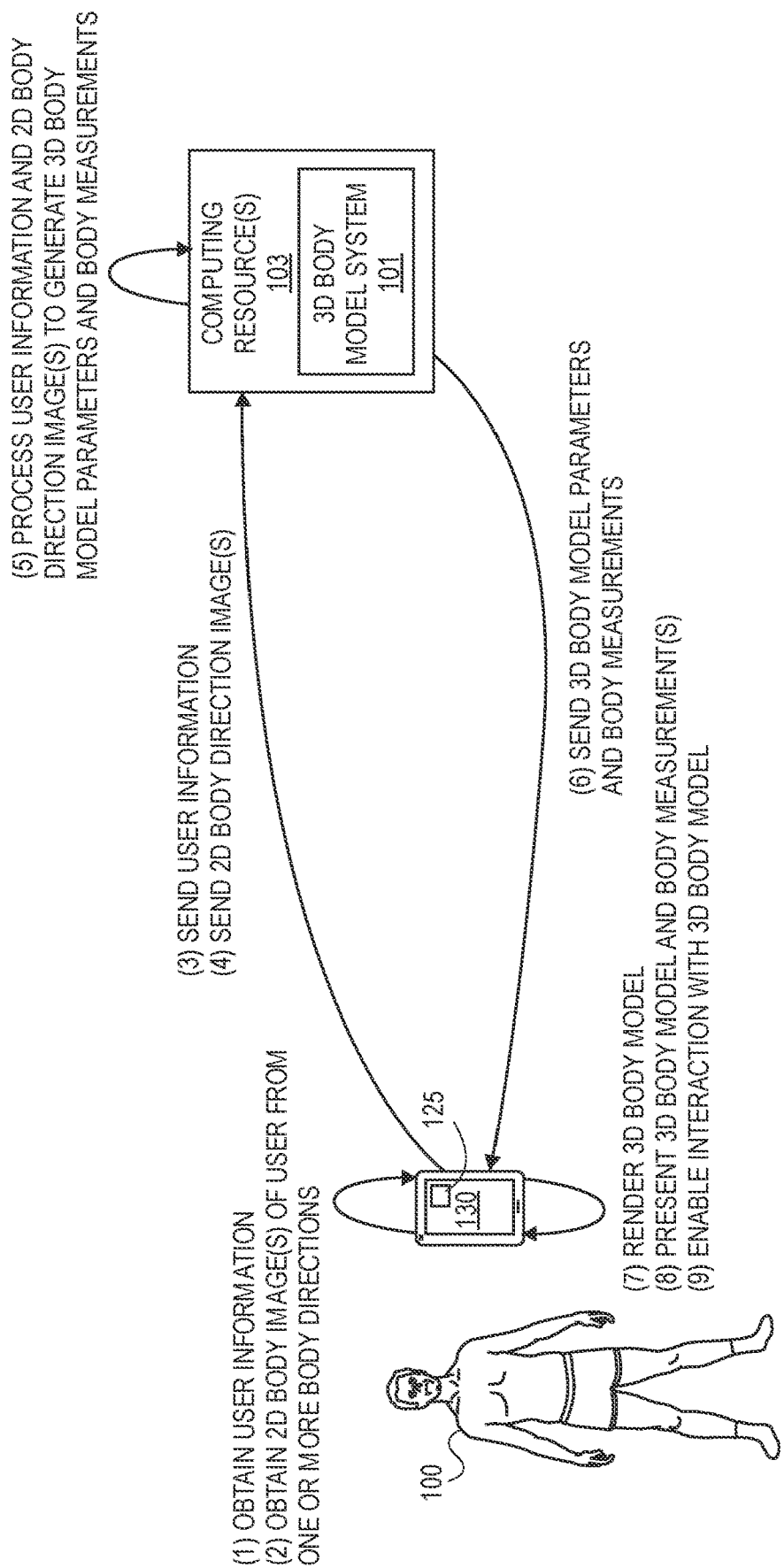
FIG. 1A is a transition diagram of two-dimensional body image collection and processing to produce a dimensionally accurate three-dimensional body model of that body that is presented back to the user, in accordance with implementations of the present disclosure.

FIG. 1A is a transition diagram of 2D body image collection and processing to produce a dimensionally accurate 3D body model of a body of a user 100 that is presented back to the user, in accordance with implementations of the present disclosure.

In some implementations, a user 100 may execute an application 125 on a portable device 130, such as a cellular phone, tablet, laptop, etc., that includes an imaging element (e.g., camera) and interact with the application. The imaging element may be any conventional imaging element, such as a standard 2D Red, Green, Blue ("RGB") digital camera that is included on many current portable devices. Likewise, images, as discussed herein may be still images generated by the imaging element and/or images or frames extracted from video generated by the imaging element.

The user may provide user information, such as username, password, etc., to the application so that the application can identify the user and determine a user account associated with the user. Likewise, the user may provide other user information, such as body measurements, including but not limited to weight, height, age, gender, etc. The user may select which user information is provided or choose not to provide any user information. In addition, in some implementations, the user may interact with the application executing on the portable device 130 without providing any user identifying information (e.g., operate as a guest to the application).

Upon user identification and/or receipt of user information, the user 100 positions the portable device 130 such that a field of view of the imaging element of the portable device is substantially horizontal and facing toward the user. In some implementations, the application 125 executing on the portable device 130 may provide visual and/or audible instructions that guide the user 100 in the placement and positioning of the portable device 130. For example, the application may instruct the user 100 to place the portable device 130 between waist and head height of the user and in a substantially vertical direction (e.g., between 2 and 10 degrees of vertical) such that the imaging element is pointed toward the user and the field of view of the imaging element is substantially horizontal.

Figure 1B:
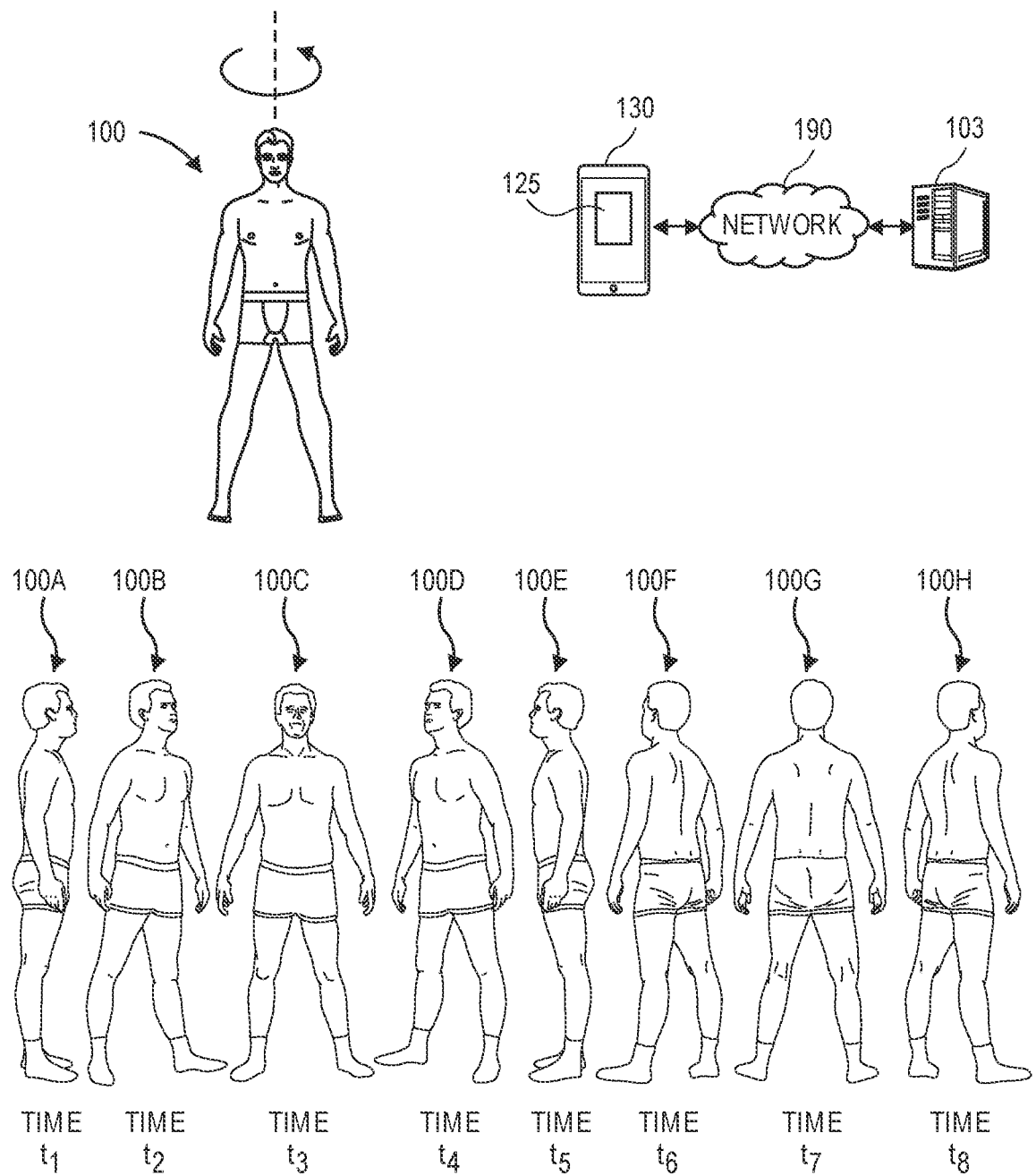
FIG. 1B illustrates different body directions of a body that may be captured in two-dimensional body images and used to produce a dimensionally accurate three-dimensional body model, in accordance with implementations of the present disclosure.

In some implementations, the application may request that the user wear a minimal amount of clothing, such as undergarments shown in FIGS. 1A and 1B. By wearing minimal clothing, processing of the 2D body image is may be more accurate.

Once the portable device is properly positioned, 2D body images of the user 100 are captured by the imaging element of the portable device 130. As discussed in more detail below, those 2D body images are processed to determine that the user is in a defined pose, such as an "A Pose," and to determine a body direction of the body of the user with respect to the camera. The defined pose may be any body position that enables image capture of components of the body. In one example, the defined pose is an "A Pose" in which the arms are separated from the sides of the body and the legs are separated, for example by separating the feet of the body to about shoulder width. The A Pose allows image processing of 2D body images to distinguish between body parts (e.g., legs, arms, torso) from different angles and also aids in body direction determination. The body direction may be any direction or orientation of the body with respect to the imaging element. Example body directions include, but are not limited to, a front side body direction in which the body is facing the imaging element, a right side body direction in which the body is turned such that a right side of the body is facing the imaging element, a left side body direction in which a left side of the body is facing the imaging element, and a back side body direction in which a back of the body is facing the imaging element. As will be appreciated, any number of body directions and corresponding orientations of the body may be utilized with the disclosed implementation and the four discussed (front side, right side, back side, and left side) are provided only as examples.

In some implementations, the application 125 executing on the portable device 130 may guide the user through different body directions and select one or more 2D images as representative of each body direction. For example, referring to FIG. 1B, an application 125 executing on the portable device 130 may guide the user into the proper pose, such as the "A Pose" illustrated by the body 100 of the user and then guide the user through a series of body directions 100A, 100B, 100C, 100D, 100E, 100F, 100G, and 100H in which the user rotates their body to the requested body direction and remains in the A Pose while 2D body images are generated and one or more of those 2D body images are selected by the application as a 2D body direction image corresponding to the current body direction of the body of the user. In the example illustrated in FIG. 1B, eight different 2D body direction images are selected by the application 125 executing on the portable device 130, one for each respective body direction 100A, 100B, 100C, 100D, 100E, 100F, 100G, and 100H. Determination of the proper defined pose and body direction and subsequent 2D body direction image selection are discussed in further detail below.

Returning back to FIG. 1A, as each 2D body direction image is selected by the application, or after all 2D body direction images are selected, the 2D body direction images are sent from the application 125 executing on the portable device 130 via a network 190 (FIG. 1B) to remote computing resources 103 for further processing. In addition, the user information provided to the application by the user 100 may be sent from the application executing on the portable device 130 to the remote computing resources 103. In other implementations, all processing may be done on the portable device. In still other examples, as images are generated, the images may be sent to the remote computing resources 103 and processed by the remote computing resources 103 to select the body direction images.

The remote computing resources 103 may include a 3D body model system 101 that receives the user information and/or the 2D body direction images and processes those images using one or more neural networks, such as a convolutional neural network, to generate 3D body model parameters corresponding to a dimensionally accurate 3D body model of the body of the user 100. In addition, one or more of the 2D body direction images, such as front side 2D body direction image may be processed to determine one or more additional body measurements, such as visual body fat percentage, body mass, bone density, etc.

The 3D body model system 101, upon generating the 3D body model parameters and body measurements, sends the 3D body model parameters and body measurements back to the application 125 executing the portable device 130. The application 125, upon receipt of the 3D body model parameters and the body measurements, generates from the 3D body model parameters a 3D body model that is representative of the body 100 of the user and presents the 3D body model and body measurements on a display of the portable device 130.

In addition to rendering and presenting the 3D body model and body measurements, the user 100 can interact with the presented 3D body model and body measurements. For example, the user may view historical information that was previously collected for the user via the application 125. The user may also interact with the presented 3D body model to rotate and/or turn the presented 3D body model. For example, if the portable device 130 includes a touch-based display, the user may use the touch-based display to interact with the application and rotate the presented 3D body model to view different views (e.g., front, side, back) of the 3D body model.

Figure 2A:
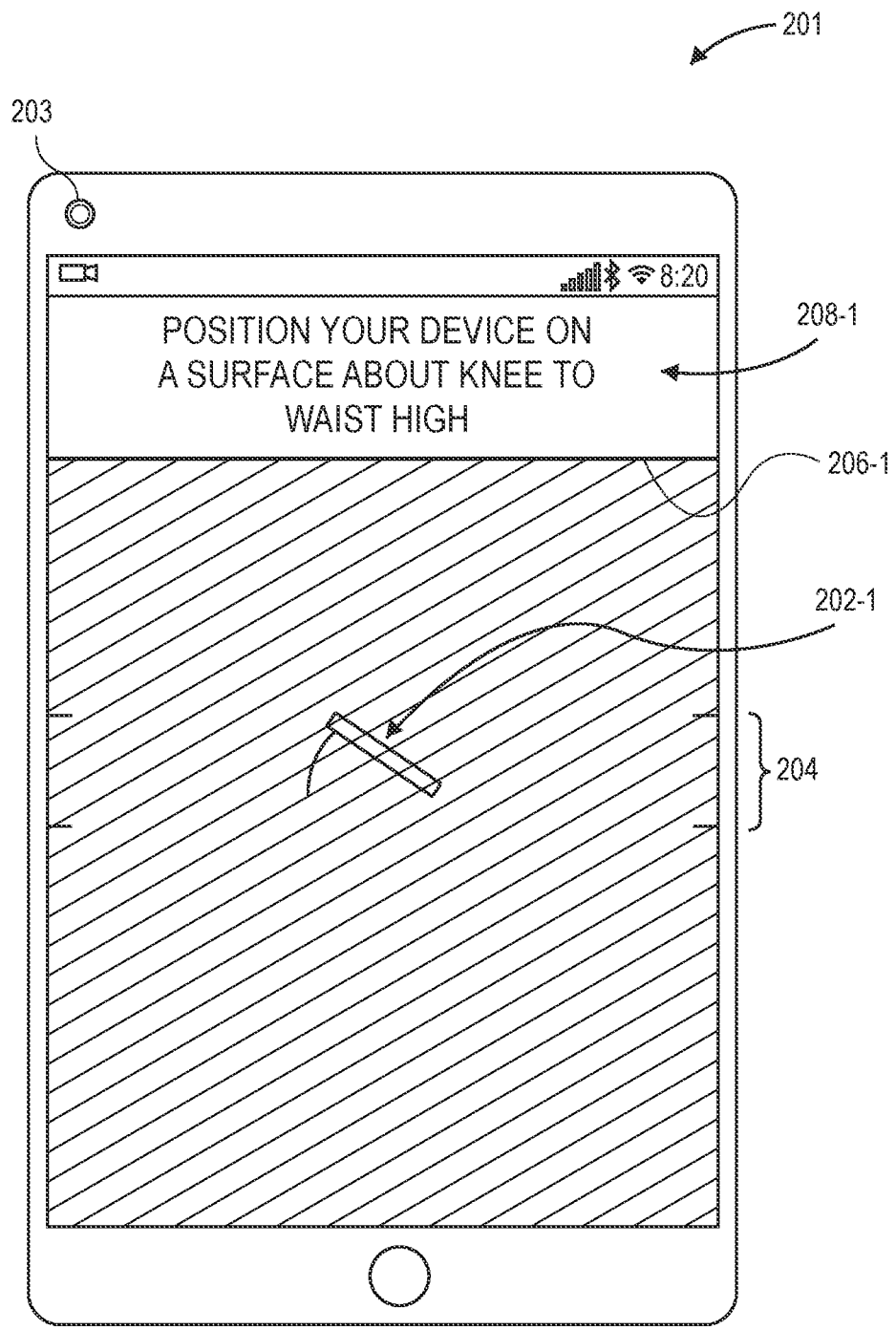
FIGS. 2A through 2F illustrate an interaction by a user and a device and the capture of images of the body of the user, in accordance with implementations of the present disclosure.
Figure 2B:
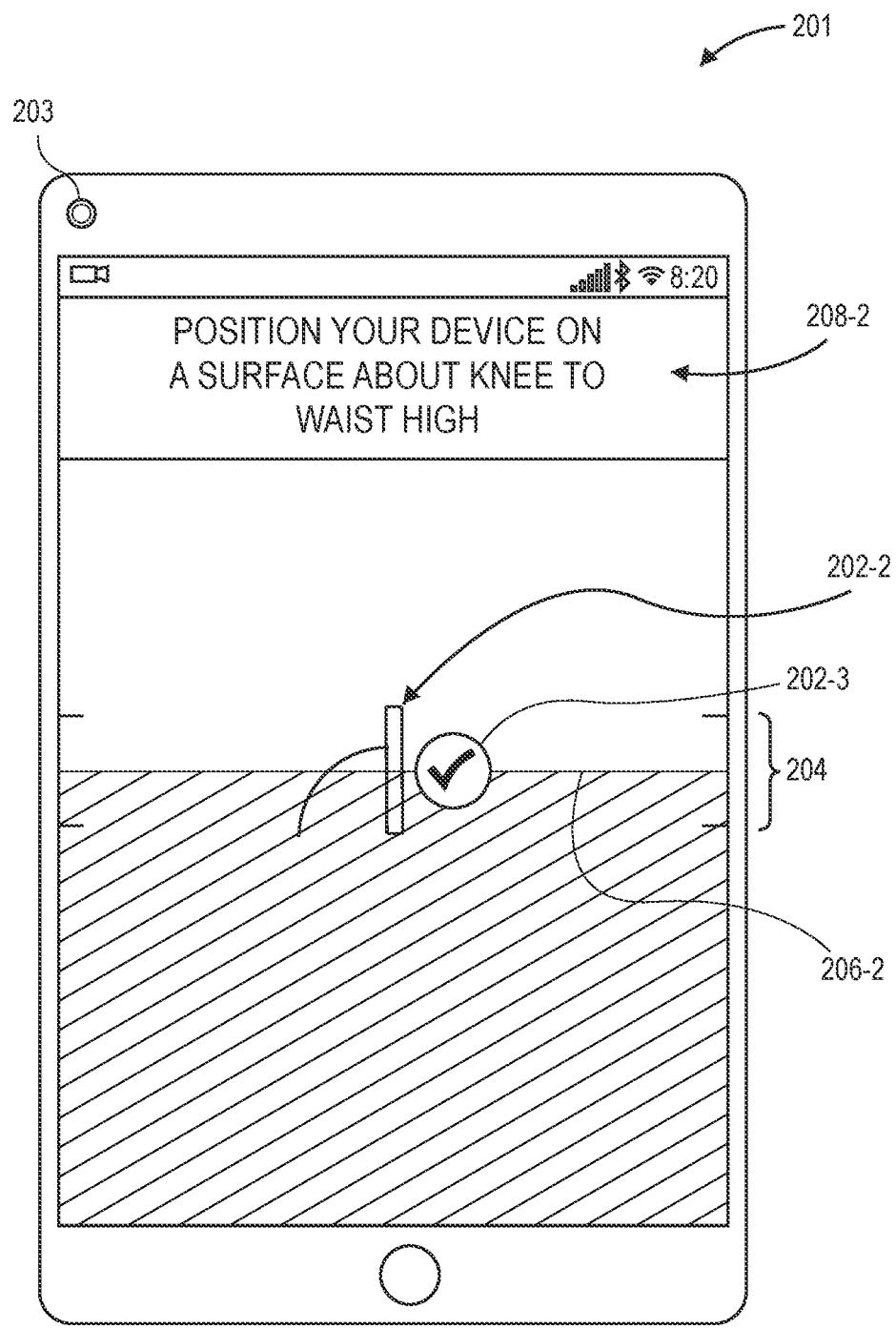

FIGS. 2A through 2F illustrate an interaction by a user and a device and the capture of images of the body of the user, in accordance with implementations of the present disclosure. For example, FIGS. 2A through 2F illustrate a portable device 201 that is used to guide a user in positioning the portable device 201, as illustrated in FIGS. 2A and 2B, and positioning of the body of the user in the field of view of an imaging element 203 of the portable device, as illustrated in FIGS. 2C through 2F.

Referring first to FIG. 2A, information is presented on the display of the portable device 201 to guide the user in placement of the portable device so that the imaging element 203 is properly positioned. In this example, notifications, such as a text based visual notification 208-1 of "Position Your Device on A Surface About Knee to Waist High" is presented on the display of the device along with a height indicator 206-1 indicating a height of the portable device 201 with respect to a desired height, indicated by marker 204, and an angle indicator 202-1 indicating a current angle of the portable device 201.

The height of the portable device, as indicated by height indicator 206-1 may be determined using one or more inputs of the portable device 201, such as a compass, altimeter, barometer, inclinometer, etc. In other examples, images of the environment may be obtained by the imaging element 203 and used to determine an approximate height of the portable device within the environment. Likewise, the angle of the portable device, as indicated by angle indicator 202-1 may be determined from one or more inputs of the portable device (e.g., accelerometer, inclinometer, etc.).

As notifications are presented to the user, the user may adjust the position of the portable device until the height and angle of the portable device are within acceptable ranges, as illustrated by height indicator 206-2 and angle indicator 202-2 in FIG. 2B. When the device is placed at the proper height and position, a confirmation notification 202-3 may be presented to the user to confirm that the device is properly positioned.

Figure 2C:
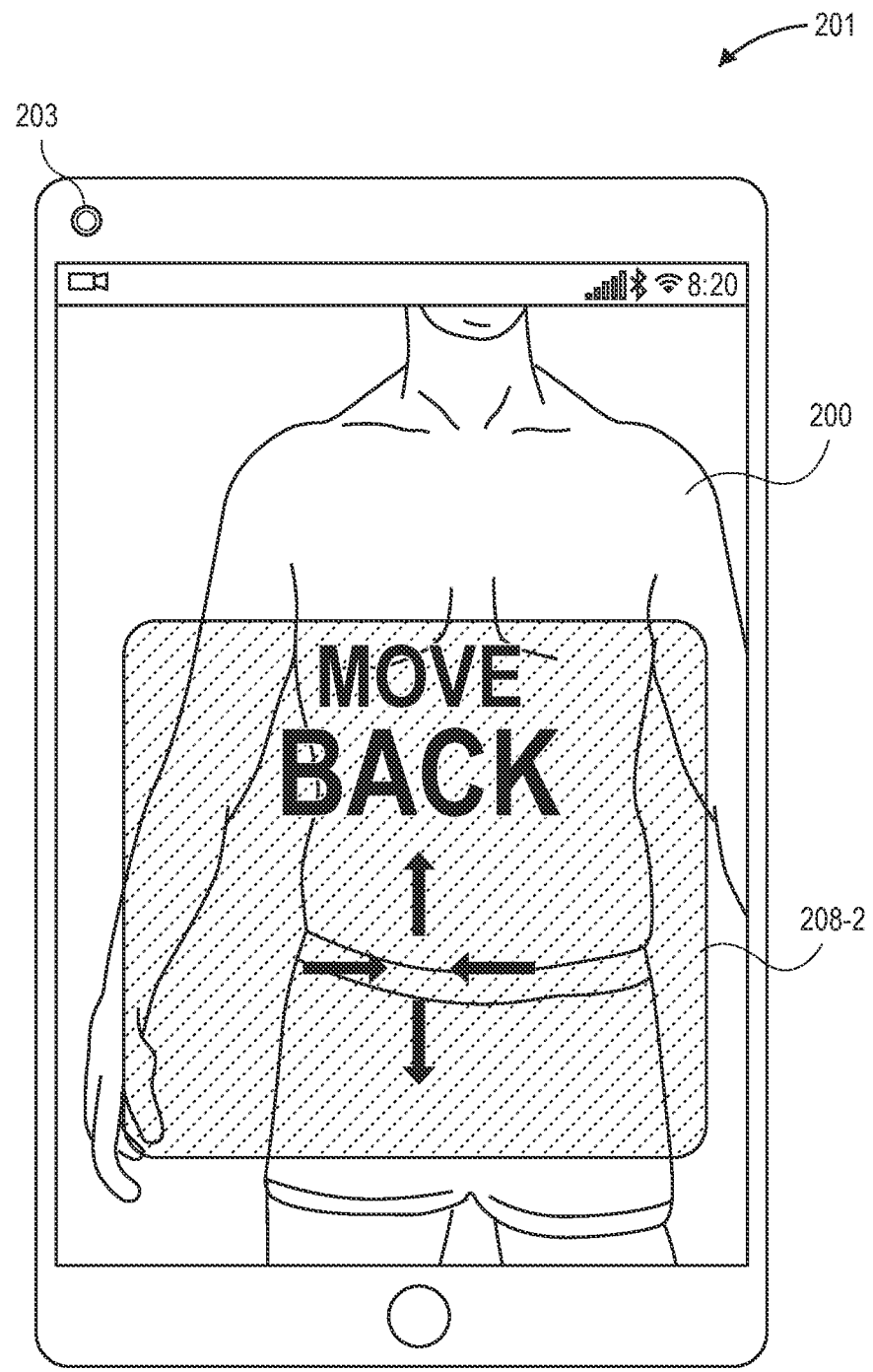

Referring now to FIG. 2C, once the device 201 is properly positioned, images of the field of view of the imaging element 203 are processed, as discussed further below, to determine if the body 200 of the user is at a proper distance and position with respect to the imaging element 203. If it is determined that the body 200 of the user is not at the proper distance and/or position, for example, if the body of the user is too close to the imaging element as illustrated in FIG. 2C, a notification 208-2 is presented to the user instructing the user as to the direction the body of the user needs to be moved (e.g., back away from the imaging element, forward toward the imaging element, right, and/or left).

Figure 2D:
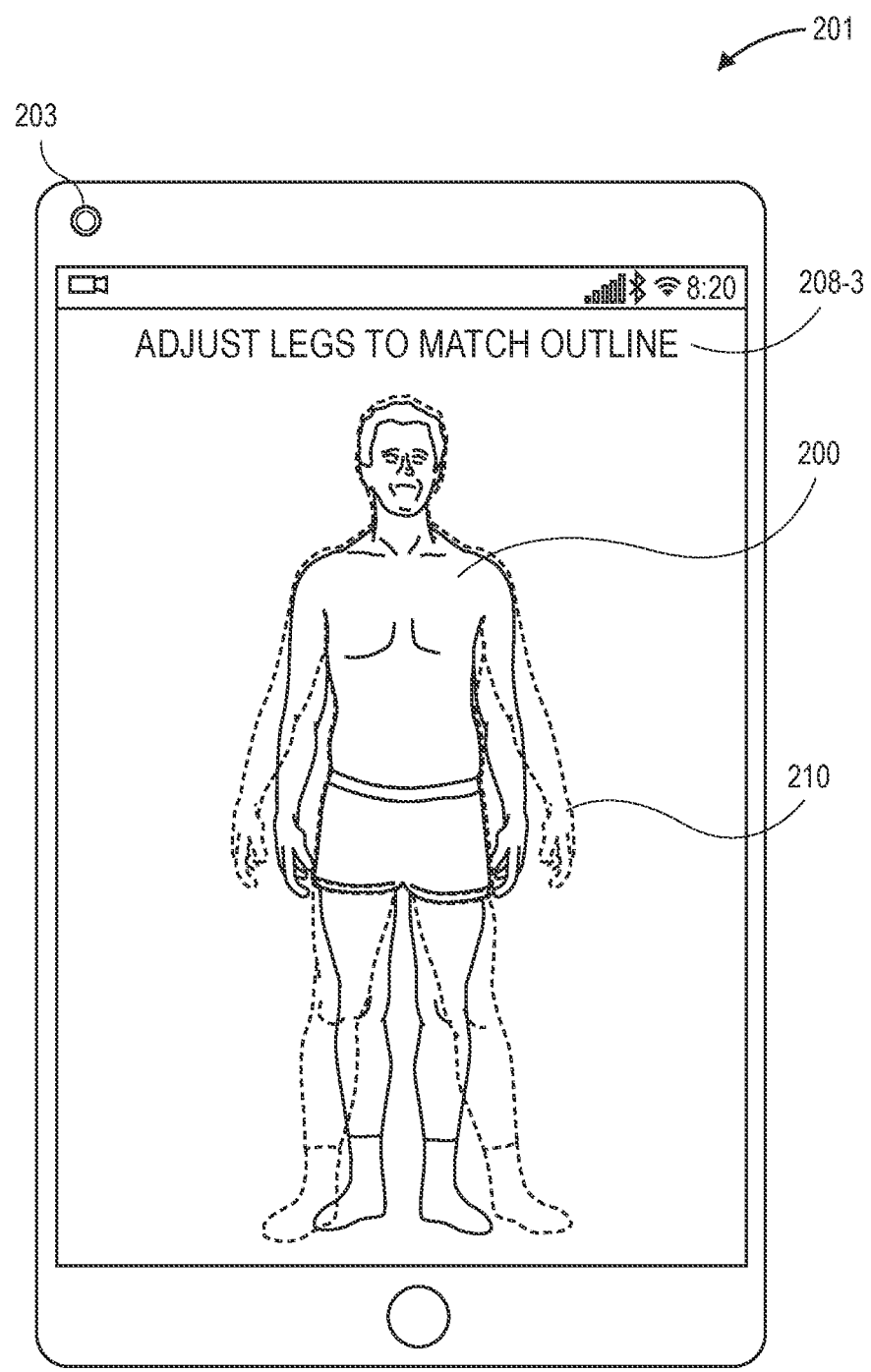

Upon determining that the body of the user is at a correct distance and position with respect to the imaging element, as illustrated in FIG. 2D, images of the body of the user are further processed to determine if the user is in a correct pose, such as the A Pose. If it is determined that the user is not in the correct pose, notifications may be sent to the user to guide the user in positioning of the body 200 of the user in the correct pose. For example, as illustrated in FIG. 2D, if it is determined that the legs are not in the correct position, a notification, such as text notification 208-3 stating "Adjust Legs to Match Outline" may be presented along with an outline 210 indicating the desired position of the body of the user.

Figure 2E:
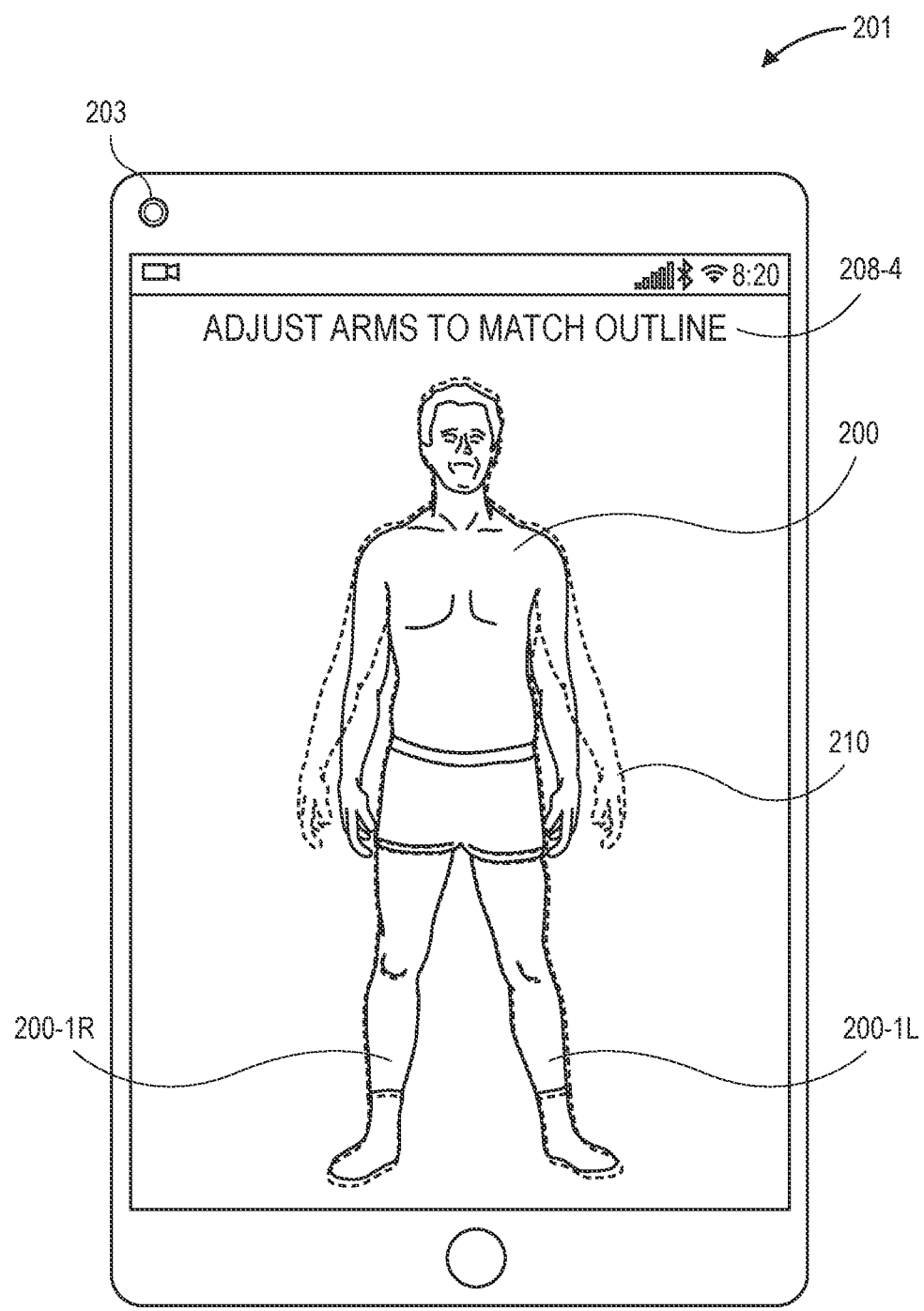

As the user positions body points into the correct positions, such as placement of the left leg 200-1L and the right leg 200-1R into the correct positions as illustrated in FIG. 2E, the notifications may be updated to provide guidance for other body points. In the illustrated example, once the user has properly positioned the legs of the body, the text notification 208-4 is updated to read "Adjust Arms to Match Outline," thereby guiding the user in placement of the arms.

Figure 2F:
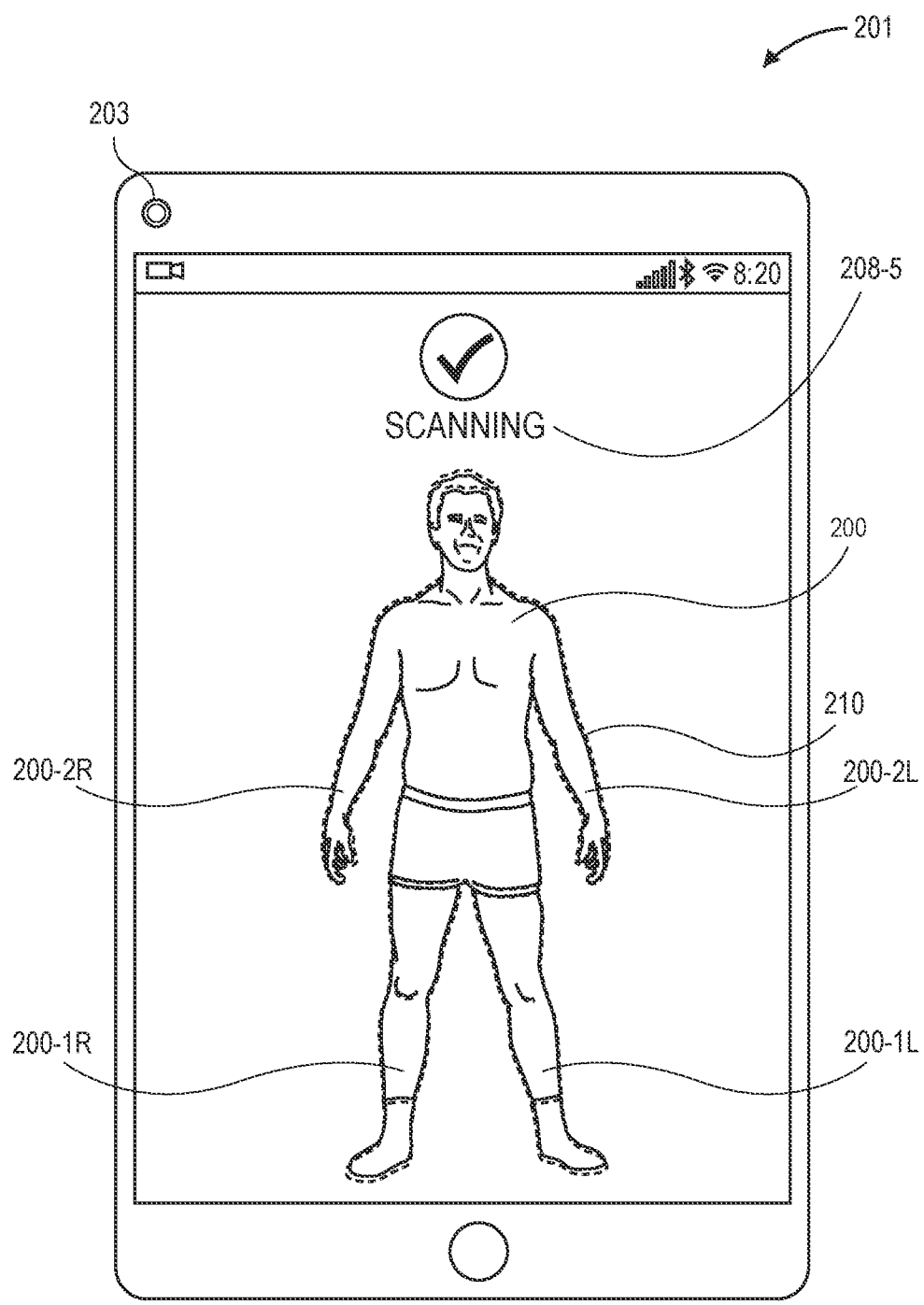

Finally, referring to FIG. 2F, as the user places the arms 200-2L, 200-2R into the correct position and it is determined that the body 200 of the user in the proper pose, such as the A Pose illustrated in FIG. 2F, a notification 208-5 may be presented confirming that the body of the user is in the correct pose and that images and/or scanning of the body of the user is progressing.

If other body directions (e.g., side, back) are to be obtained, the user interface presented on the portable device 200 may be again updated to provide a notification to the user to rotate to a different body direction and guide the user into positioning of the body into each correct pose in those body directions.

As will be appreciated, the notifications discussed above with respect to FIGS. 2A through 2F are merely examples and any different form, order, and/or type of notifications may be presented to guide the user in positioning the body of the user in the correct direction, pose, etc., in accordance with described implementations.

Figure 3A:
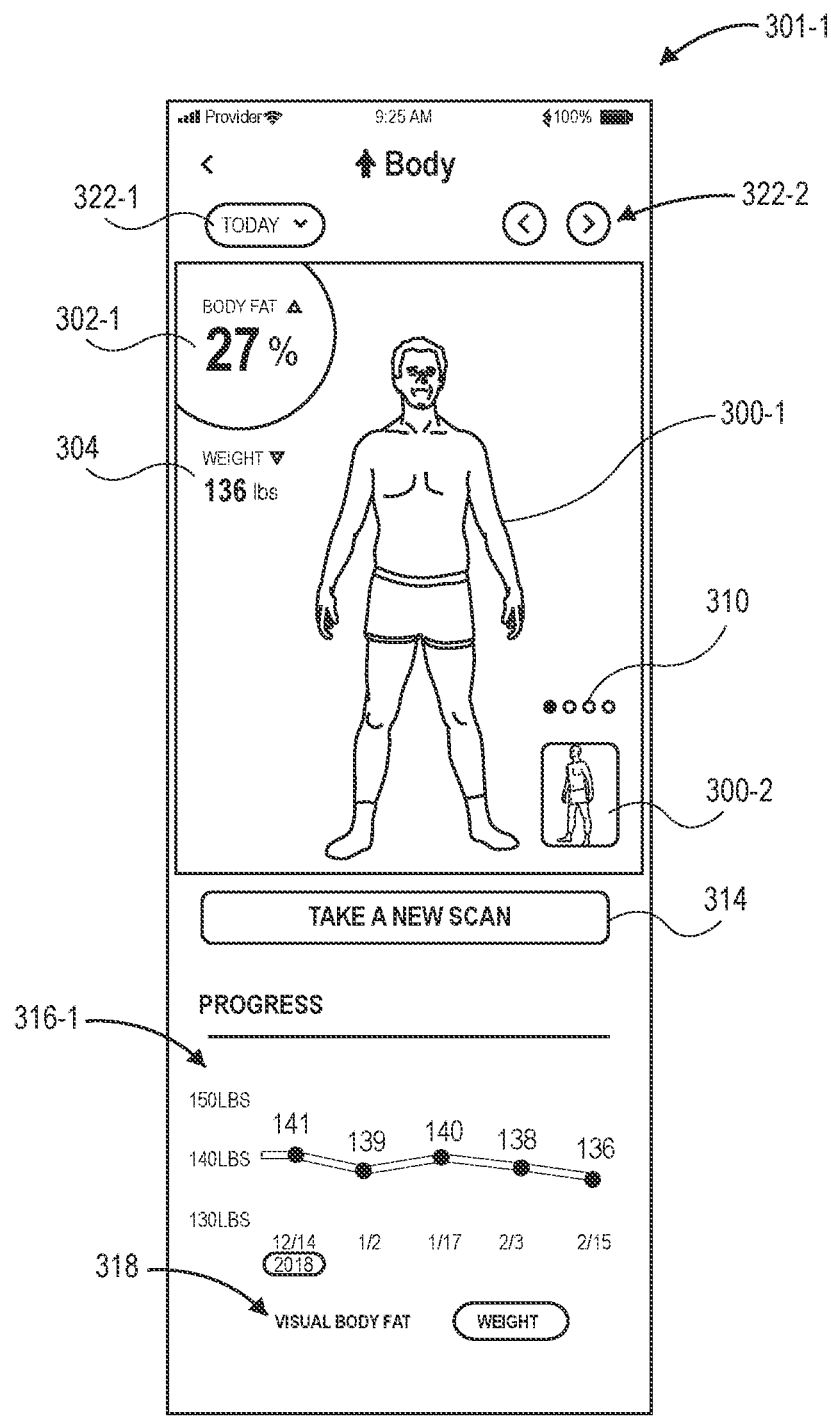
FIG. 3A is a user interface illustrating a captured two-dimensional body image and corresponding body measurement information determined from at least the two-dimensional body image, in accordance with implementations of the present disclosure.

FIG. 3A is a user interface 301-1 presented by an application executing on a portable device, such as the application 125 executing on the portable device 130 discussed above with respect to FIG. 1A, in accordance with implementations of the present disclosure.

Figure 3B:
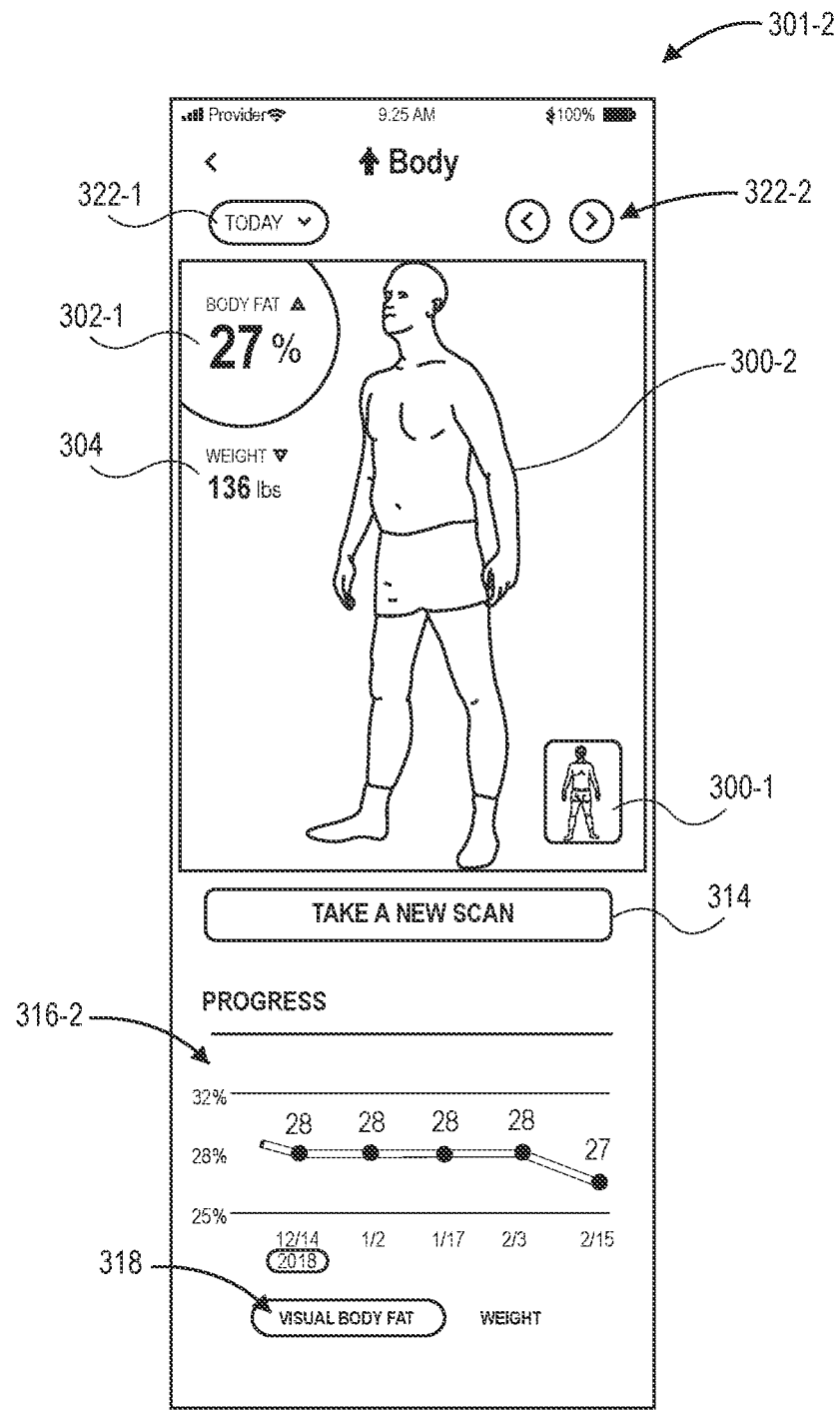
FIG. 3B is a user interface illustrating a three-dimensional body model and corresponding body measurement information generated from a two-dimensional body image, in accordance with implementations of the present disclosure.

In this example, the user interface 301-1 illustrates a 2D body direction image 300-1 captured by an imaging element of the portable device that was used to generate and present a 3D body model and corresponding body measurement information. In this example, the illustrated user interface 301-1 shows the 2D body direction image, the body fat percentage 302-1 determined for the body, and the weight 304 of the body, which may be determined from the 2D model image 300-1 and/or provided as user information by the user. In other implementations, additional or fewer body measurements may be presented on the user interface 301-1 by the application. A user interacting with the user interface 301-1 may also select to view other 2D body direction images that were used to generate a 3D body model and/or body measurements, by selecting the indicators 310 and/or swiping or otherwise indicating with the user interface 301-1 to alter the currently presented 2D body direction image 300-1. The user may also alternate between a view of 2D body direction images 300-1, as illustrated in the user interface 301-1 of FIG. 3A and the rendered and presented 3D body model 300-2, as illustrated in the small image presentation of the 3D body model 300-2 in FIG. 3A and as illustrated as the primary image 300-2 in user interface 301-2 of FIG. 3B. Referring briefly to FIG. 3B, the user may interact with to rotate and/or change the view of the 3D body model 300-2 by directly interacting with the 3D body model 300-2. For example, the user may rotate the presentation of the 3D body model to view different portions of the 3D body model, zoom out to view more of the 3D body model, or zoom in to view details corresponding to a portion of the 3D body model.

In some implementations, if the user has utilized the application over a period of time to generate multiple instances of 3D body models of the user, the user interface may also present historical body measurements 316 corresponding to the different dates in which 2D body images of the body of the user were captured and used to generate a 3D body model and body measurements of the body of the user. In the illustrated example, the user may select between viewing historical body weight 316-1 illustrated in FIG. 3A and visual body fat percentage 316-2, as illustrated in FIG. 3B, through selection of the toggle control 318. In other implementations, different or additional historical body measurements 316 may be accessible through the user interface 301.

In addition to viewing historical body measurements 316, the user may also access and view either the 2D body images that were collected at those prior points in time and/or view the 3D body models generated from those prior 2D body images, through selection of the date control 322-1 or the arrow control 322-2.

Finally, the user may interact with the user interface 301 to select to take a new scan of their body by selecting the Take A New Scan control 314. In response to a user selecting the Take A New Scan control 314, the application executing on the portable device will provide instructions to the user to position the user in the defined pose (e.g., A Pose) and at proper body directions so that 2D body direction images can be generated and used to produce a 3D body model of the body of the user, as discussed herein.

Figure 4:
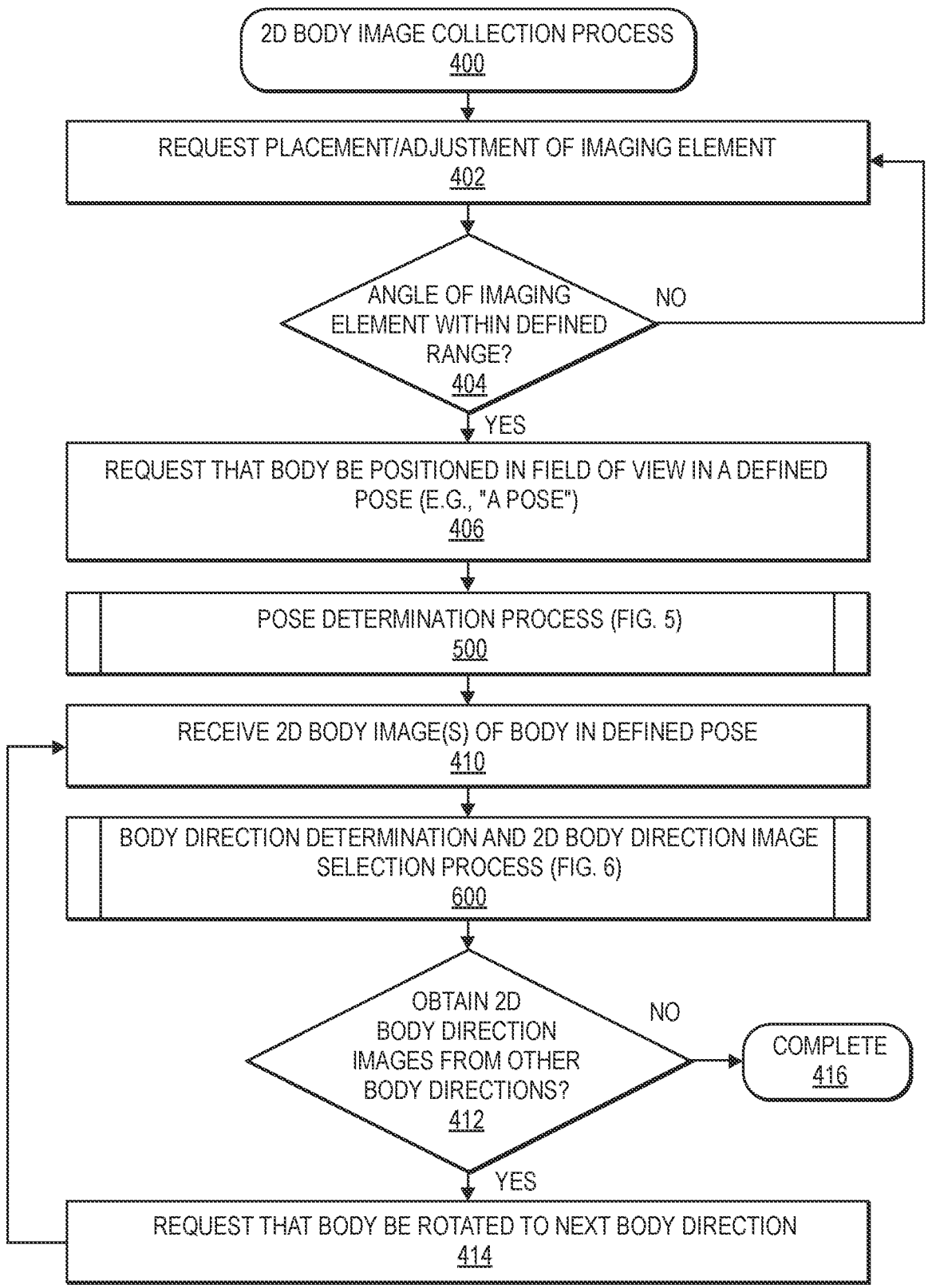
FIG. 4 is an example two-dimensional body image collection process, in accordance with implementations of the present disclosure.

FIG. 4 is an example 2D body image collection process 400, in accordance with implementations of the present disclosure. In some implementations, the example process 400 may be performed by an application executing on a portable device, such as the application 125 executing on the portable device 130 as discussed above with respect to FIGS. 1A and 1B. In other implementations, the example process 400 may be performed by one or more remote computing resources that receives images from the portable device and sends information/messages to the portable device. In still other examples, a portion of the example process 400 may be performed on the portable device and another portion may be performed by the remote computing resources.

The example process 400 begins, for example, when a user interacting with an application executing on a portable device requests to have a 3D body model of their body generated. When the process 400 initiates, a request is presented (visually and/or audibly) that an imaging element, such as a camera, or the portable device that includes the imaging element, be positioned at a height, such as between the knees of the body and the head of the body (e.g., between two feet and six feet) and oriented such that the field of view of the portable device is substantially horizontal and oriented toward the body, as in 402. For example, the application executing on the mobile device may present a visual and/or audible output requesting that the portable device be placed within two and five degrees of vertical at about waist height such that the imaging element of the portable device is substantially horizontal and oriented toward the body of the user.

As the imaging element/portable device is placed into position, a determination is made as to whether the angle of the imaging element/portable device is within a defined range, as in 404. For example, data from one or more inputs of the portable device, such as an accelerometer, may be received and processed to determine an angle of the portable device and thus, the angle of the imaging element. The defined range may be any range at which image distortion does not impact the processing of the images to generate the 3D body model, as discussed herein. For example, the defined range may be between zero degrees and ten degrees from vertical. In other implementations, the defined range may be more than zero degrees (e.g., two degrees) to reduce chances of the device falling over due to lack of stability. Likewise, in some implementations the upper bound of the defined range may be less or more than ten degrees. In some instances, the defined range may be greater than or equal to the range or angle indicated in the request to the user for placement of the imaging element/portable device.

If it is determined that the angle of the imaging element is not within the defined range, the example process 400 returns to block 402 and requests adjustment of the imaging element/portable device until the imaging element/portable device is at an angle that is within the defined range. For example, referring back to FIGS. 2A and 2B, visual, tactile, and/or audible feedback may be presented by the portable device that includes the imaging element to guide the user in positioning the imaging element within the defined range.

Once it is determined that the angle of the imaging element/portable device is within the defined range, a confirmation message may be sent to the user, as illustrated in FIG. 2B, and a request may be presented, audibly and/or visually, that the body to be scanned be positioned in the field of view of the imaging element in a defined pose, such as the "A Pose," as in 406. Any defined pose may be requested. When the user is in the A Pose, their arms are slightly separated from their torso and their legs are separated about shoulder width apart such that both their arms and their legs are slightly splayed out diagonally. The A Pose may be particularly beneficial as it separates the body appendages (arms, legs) from each other and from the body core/torso are so that image processing can properly identify and define the parts of the body and body point locations, as discussed further below.

In some implementations, the focal point of the imaging element may also be adjusted based on the position of the body in the field of view of the imaging element. For example, rather than focusing on the entire image, the example process 400 may cause the imaging element to adjust the focal point to focus on the body of the user. Likewise, the exposure of the imaging element may be adjusted based on the lighting of the body of the user within the field of view of the imaging element.

Figure 5:
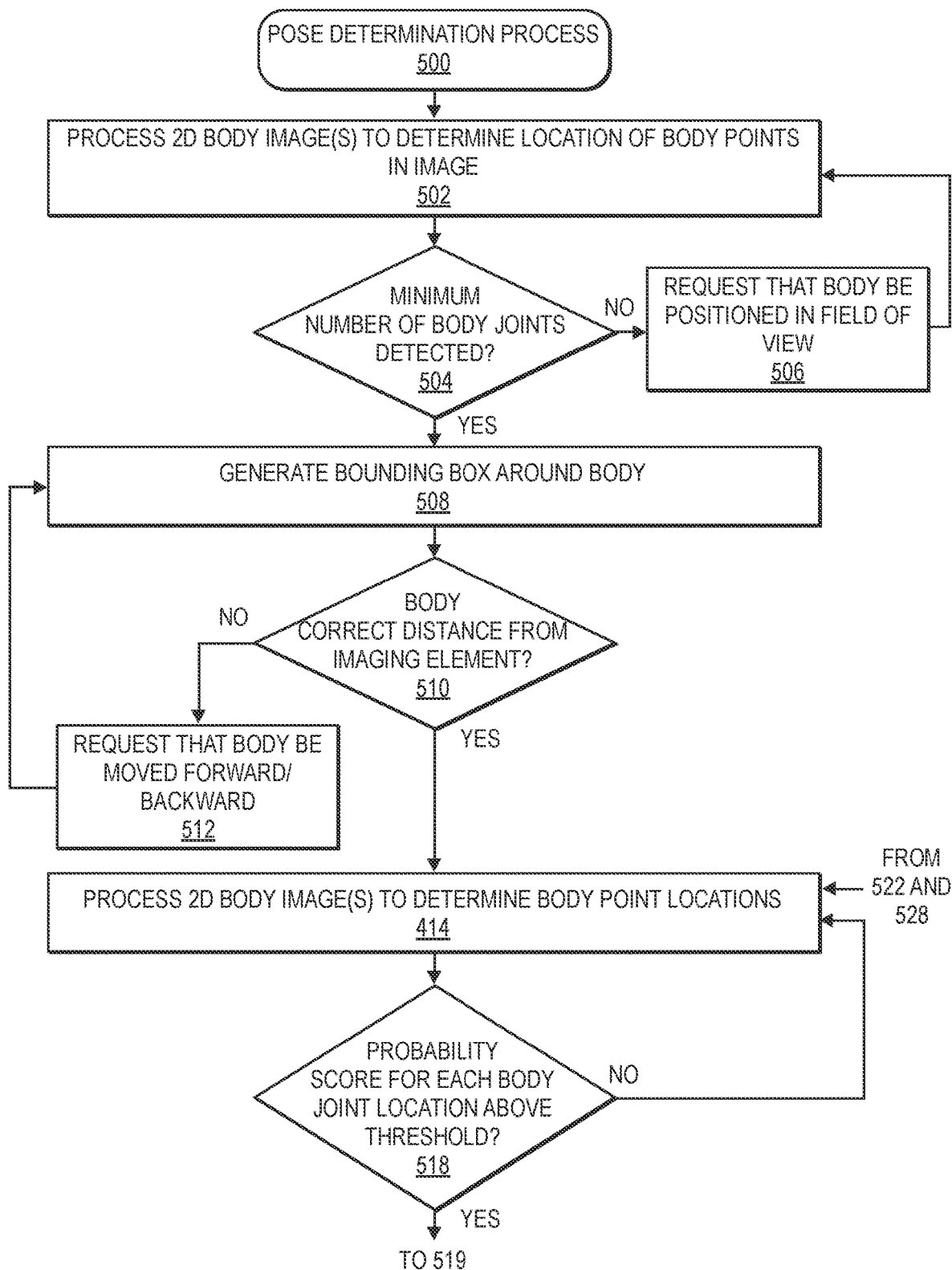
FIG. 5 is an example pose determination process, in accordance with implementations of the present disclosure.
Figure 5:
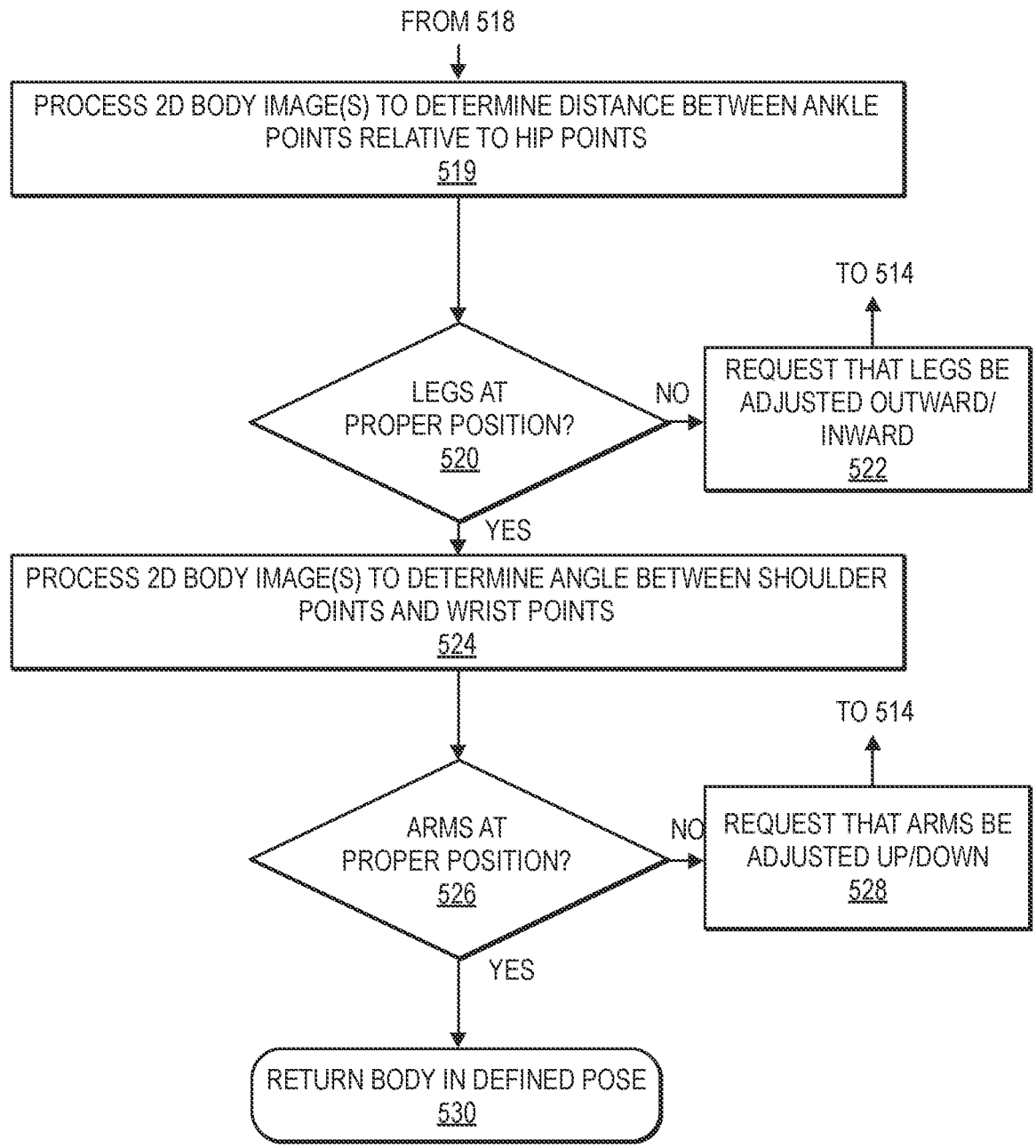

As the request that the user position the body in a defined pose, such as the A Pose, the pose determination process 500 discussed further below with respect to FIG. 5, is performed to confirm that the body is positioned within the field of view of the imaging element and in the defined pose, as in 500. The example process 500 may be performed as illustrated herein at a defined point within the example process 400 to confirm the position and pose of the body before other aspects of the example process 400 are performed. In other implementations, once the example process 500 is initiated, it may continue to monitor the position and pose of the body while the other aspects of the example process 400 are performed. For example, the example process 500, as discussed below, may continue to monitor that the body of the user remains in the field of view and in the defined pose while 2D body images of the body in different body directions are captured, as discussed below. If, during other aspects of the example process 400 it is determined that the body is no longer positioned in the field of view of the imaging element or the body is no longer in the defined pose, the example process 500 may generate a request that the body be positioned in the field of view with the defined pose before other aspects of the example process 400 proceed.

When the example process 500 confirms that the body is within the field of view of the imaging element and in the defined pose, one or more 2D body images of the body in the defined pose are received from the imaging element, as in 410. For example, as illustrated in FIG. 2F, once it is determined that the body is in the defined pose, one or more images of the user may be obtained by the imaging element of the portable device. Those received images are then processed to determine a body direction of the body and to select a 2D body direction image representative of the body in the determined body direction, as in 600. Body direction determination and 2D body direction image selection are discussed below with respect to FIG. 6 and the example process 600.

Upon completion of the example process 600 in which body direction is determined and one or more 2D body direction images are selected and provided to remote computing resources, a determination is made as to whether additional 2D body direction images of the body from other body directions are to be obtained as part of the example process 400, as in 412. In some implementations, only a single 2D body direction image may be obtained and used to generate 3D body model parameters and/or body measurements. In other implementations, multiple 2D body direction images of the body in different body directions may be obtained with the example process 400 that are used together to generate 3D body model parameters and/or body measurements. For example, in some implementations, four different 2D body direction images (e.g., front side, right side, back side, left side) may be obtained with the example process 400 and used by the remote computing resources to generate 3D body model parameters and/or body measurements. In other implementations, more or fewer than four 2D body direction images may be obtained. In some examples, the user of the application executing on the portable device may select how many 2D body direction images are to be obtained and used for 3D body model parameter generation.

If it is determined that additional 2D body direction images are to be selected and provided to the remote computing resource for use in generating 3D body model parameters and/or body measurements, a request is presented (e.g., visually and/or audibly) that the body be rotated to a next body direction, as in 414. In some implementations, there may be a defined order in which the body is to be rotated. For example, body direction determination may proceed from front side, to right side, to back side, to left side. Such an order of body direction rotation may aid in the accuracy of body direction determination and distinguishing between left side and right side, or front side and back side.

As the request that the body rotate to a next body direction, the example process 400 returns to block 410 and continues. This portion of the process 400 may continue until all 2D body direction images that are to be used for processing by the remote computing resources have been selected and sent to the remote computing resources. If it is determined at decision block 412 that no additional 2D body direction images are to be obtained, the example process 400 completes, as in 416.

FIG. 5 is an example pose determination process 500, in accordance with implementations of the present disclosure. Similar to the example process 400 (FIG. 4), the example process may be performed by an application executing on a portable device, such as application 125 executing on portable device 130, discussed above with respect to FIGS. 1A and 1B. In other implementations, the example process 500 may be performed by one or more remote computing resources that receives images from the portable device and sends information/messages to the portable device. In still other examples, a portion of the example process 500 may be performed on the portable device and another portion may be performed by the remote computing resources.

As discussed above, the example process 500 may be performed at or near the beginning of the example process 400 to confirm that the body is within the field of view of the imaging element and in the defined pose and then complete. In other implementations, the example process 500 may continually be performed as images are received as part of the example process 400 and 2D body direction images selected.

The example process 500 begins by processing 2D body images received from the imaging element to determine a location of body joints, body features, body parts, etc., generally referred to herein as "body points," in the image, as in 502. For example, each image received from the imaging element may be processed by a neural network, such as a convolutional neural network ("CNN") to determine body point locations, such as the location of body joints (e.g., wrist, ankle, knee), the location of body parts (e.g., hand, foot, shoulder), and/or other body points. As will be appreciated, any trained neural network may be utilized to determine body point locations within a 2D image. In some implementations, because body point determination is performed on the portable device, a low latency neural network, such as ENet may be trained and utilized. In other implementations, other neural networks may be utilized.

The output of the neural network for each image may be a heat map indicating, for each pixel of the image, which is defined by an x, y coordinate (or other coordinate frame), a probability score that a body point is at that position. The probability score may be any defined value or indicator that may be used as in indicator as to the likelihood that a body point has is at the location.

An initial determination may be made as to whether the body is positioned within the field of view of the imaging element by determining if a minimum number of body point locations have been detected with a high enough probability, as in 504. The minimum number may be any defined amount (e.g., one, two, four, etc.). While multiple body points may be located, in some implementations, only particular body points may be considered in determining whether the minimum number of body point locations have been determined. For example, in some implementations, the body point locations for the left shoulder, right shoulder, left ankle, right ankle, left wrist, right wrist, and top of head may be the only body point locations that are considered when determining that the minimum number of body point locations have been determined.

If it is determined that the minimum number of body point locations have not been detected, a request (e.g., visual and/or audible) may be presented that requests that the body be positioned in the field of view, as in 506. If it is determined that a minimum number of body point locations have been determined, a bounding box is formed around the determined body point locations, as in 508, and a determination made as to whether the body is at an appropriate distance from the imaging element/portable device, as in 510. For example, a determination may be made as to whether the bounding box encompasses a defined amount or percentage range (e.g., 60%-70%) of the image, whether a height of the bounding box is within a defined percentage range (e.g., 70%-80%) or amount of the entire height of the image, whether a width of the bound box is within a defined percentage (e.g., 30%-50%) or amount of the entire width of the image, etc.

If it is determined that the bounding box does not encompass a defined amount of the image, a request (visual and/or audible) may be presented requesting that the body be moved forward or backward with respect to the imaging element/portable device, as in 512, and the example process 500 returns to block 508 and continues. For example, if it is determined that the bounding box does not encompass enough of the image, the request may be a request that the body move closer to the imaging element/portable device. In comparison, as illustrated in FIG. 2C, if the bounding box encompasses too much of the image, or portions of the body point locations are beyond the image, the request may be a request that the body move farther away from the imaging element/portable device.

Once it is determined at decision block 510 that the body is at a correct distance from the imaging element/portable device, 2D body images received from the imaging element are processed to determine body point locations, as in 514. Processing of the 2D body images to determine body point locations may be performed using the same neural network discussed above with respect to block 502 that is executing on the portable device to determine body point locations of the body positioned in the field of view of the imaging element. As discussed above, the output for each 2D body image processed by the neural network may be a heat may that indicates for each pixel of the 2D body image (in x, y coordinates) a probability that a body point is at that location.

The output (heat map) for each 2D body image may then be considered and a determination made as to whether the probability score for each body point location is above a threshold, as in 518. The threshold may be any value (e.g., 0.7) or indicator and may be different for different body points and/or different body point locations. Likewise, in some implementations, the determination may be for all body point locations indicated by the processing of the 2D body images. In other implementations only the locations and probability scores for select body points may be considered when determining if the probability score has been exceeded for those body point locations. For example, in some implementations, the example process may only consider whether the body point locations for the body points of left shoulder, right shoulder, left ankle, right ankle, left wrist, right wrist, left hip, right hip, and top of head exceed the threshold. In other implementations, fewer or additional body point locations may be considered.

If it is determined that the probability score for each body point location is not above the threshold, the example process 500 returns to block 514 and processes the next 2D body image.

Once it is determined that the body point locations do exceed the threshold, the 2D body image is processed to determine a distance between the location of the left ankle point and the right ankle point relative to the distance between the left hip point and the right hip point, as in 519. For example, it may be determined if the distance between the left ankle point and the right ankle point is equal to or greater than the distance between the left hip point and the right hip point.

Based on the relationship between the distance between the left ankle point and the right angle point relative to the distance between the left hip point and the right hip point, a determination is made as to whether the legs are at a proper position, as in 520. For example, if the defined pose is the A Pose, it may be determined that the legs are in the proper position if the distance between the left ankle point and the right ankle point is greater than or equal to the distance between the left hip point and the right hip point. If the distance between the left ankle point and the right ankle point is not greater than or equal to the distance between the left hip point and the right hip point, it may be determined that the legs are not in a proper position.

If it is determined that the legs are not in a proper position, a request is presented (visually and/or audibly) that the legs of the body be adjusted outward or inward, as in 522. For example, as illustrated in FIG. 2D, if it is determined that the distance between the left ankle point and the right ankle point is less than the distance between the left hip point and the right hip point, a visual, audible, and/or tactile notification may be presented by the portable device requesting that the legs of the body be separated farther apart. As the request is presented, the example process 500 returns to block 514 and continues until it is determined at decision block 520 that the legs are in the proper positioned for the defined pose.

Once it is determined at decision block 520 that the legs are in the proper position, the 2D body images are processed to determine an angle between the shoulder points and the wrist points, as in 524. For example, an inverse cosine of normalized dot product may be performed to determine arm spacing based on the locations determined for the left shoulder point, the left wrist point, the right shoulder point, and the right wrist point.

Based on the determined angles between the shoulder points and the wrist points, a determination is made as to whether the left arm and right arm are at the proper position, as in 526. Continuing with the above example, if the defined pose is the A Pose, the proper space of the arms may be such that the angle of the arm formed between the should point and wrist point is between 20 degrees and 40 degrees. In other examples, the arm spacing may be different.

If it is determined that the arms are not at a proper position, as illustrated in FIG. 2E, a visual, audible, and/or tactile notification may be presented by the portable device requesting that the arms be adjusted up or down, as in 528.

For example, if it is determined that the angle of the arms exceed the range for the defined pose, the request may be a request that one or both arms be lowered. In comparison, if it is determined that the angle of the arms is below the range for the defined pose, the request may be a request that one or both arms be raised. As the request is presented, the example process 500 returns to block 514 and continues until it is determined at decision block 526 that the arms are in the proper positioned for the defined pose.

Once it is determined that the arms are in the proper position, the example process 500 returns a notification that the body is in the defined pose (e.g., the A pose), as in 530.

While the above example proceeds in a sequential manner determining that the distance between the body and the imaging element/portable device is correct, the legs are properly positioned, and then the arms are properly positioned, in other implementations, the determination and/or notification for each of the above may be done in parallel or in a different order. Likewise, in some implementations, the requests to make one or more adjustments (e.g., move forward/backward, spread/narrow legs, raise/lower arms) may be presented in any order and/or may all be presented concurrently. In addition, as noted above, the requests may be output by the application executing on the portable device as visual and/or audible outputs. For example, the application may present on a display of the portable device the image of the of the user body as the 2D body images are obtained by the imaging element and overlay a silhouette or other indicator as the proper position for the body according to the defined pose. Specific requests that the user move forward/backward, spread/narrow legs, raise/lower arms may be presented in conjunction with the visual indicators to aid the user in positioning the body in the correct pose.

Figure 6:
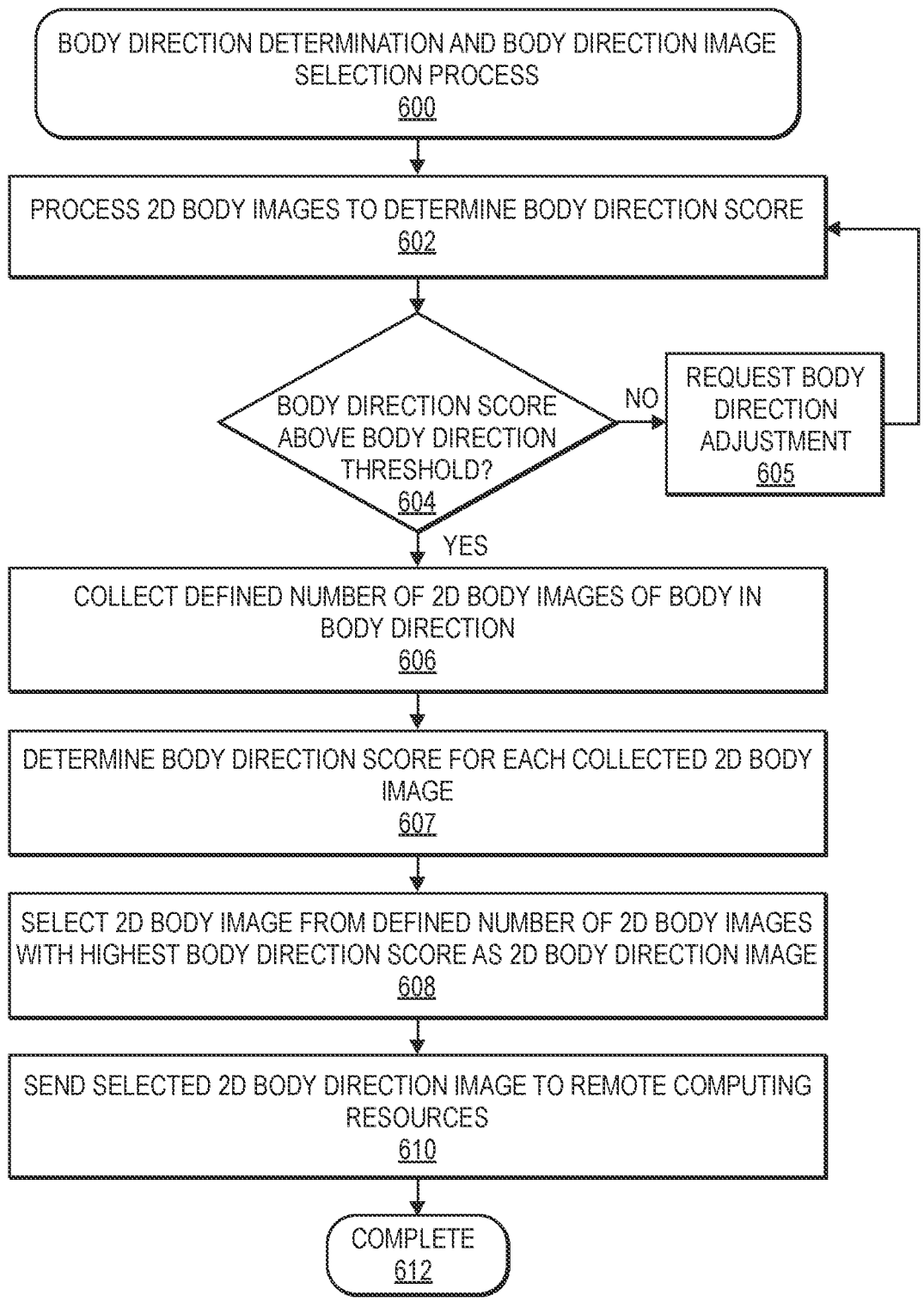
FIG. 6 is an example body direction determination and body direction image selection process, in accordance with implementations of the present disclosure.

FIG. 6 is an example body direction determination and body direction image selection process 600, in accordance with implementations of the present disclosure. Similar to FIGS. 4 and 5, the example process 600 may be performed on a portable device, on remote computing resources, or on a combination of a portable device and remote computing resources.

The example process 600 begins by processing 2D body images received from the imaging element of the portable device to determine a body direction score indicative of a direction of the body represented in the 2D body image with respect to the imaging element/portable device, as in 602. Like the example process 400 (FIG. 4) and 500 (FIG. 5), the example process 600 may be performed by the application executing on the portable device. As such, a low latency image processing technique may be performed to determine the body direction of the body represented in the received 2D body images. For example, a low latency neural network, such as a CNN, may be trained to determine a body direction of a body. In one example a MobileNet CNN may be trained to determine a body direction of a body represented in a received 2D body image. In other implementations, multiple CNNs, one for each potential body direction, may be trained to process input 2D body images and output a score indicating a probability that the body represented in the 2D body image corresponds to the body direction for which the CNN was trained. For example, if the example process 400 (FIG. 4) is to obtain 2D body direction images from a front side, right side, back side, and left side, a different CNN may be trained for each of those four body directions. Received 2D body images may be processed in parallel by each of the four CNNs and a body direction score presented by each CNN indicating a probability that the body represented in the 2D body image is in the body direction trained for that CNN.

The CNN with the highest score will indicate the likely body direction of the body represented in the 2D body image.

In some implementations, the order of body directions may be controlled by the application and a request may be presented that the body be initially oriented to the front side, then right side, then back side, then left side (or any other order). In such an example, processing requirements may be further reduced by only processing received 2D body images with the CNN trained for the requested body direction. For example, if the request is that the body be oriented in a right side view with respect to the imaging element, a CNN trained for right side body direction detection may be the only CNN executed to process received 2D body images.

As body direction scores are generated, a determination is made as to whether a body direction score for one of the body directions, or a requested body direction, is above a body direction threshold, as in 604. The body direction threshold may be any value or indicator relative to a confidence that the body direction has been accurately determined. If it is determined that the body direction score does not exceed the body direction threshold, a request is presented (visually and/or audibly) that the body be adjusted to the body direction, as in 605. As the request is presented, the example process 600 returns to block 602 and continues.

Once it is determined at decision block 604 that the body direction score for a received 2D body image exceeds the body direction threshold, a defined number of 2D body images of the body in the 2D body direction are collected, as in 606. The defined number of 2D body images may be any defined number (e.g., one, two, five, twenty, fifty, etc.). In addition, a body direction score is computed for each of the collected 2D body images, as in 607. The body direction scores may be computed using the same neural network utilized and discussed above with respect to block 602. For example, if the body direction is determined to be a front view, a CNN trained for front view body directions may be used to determine body directions scores for each of the collected 2D body images.

A 2D body image of the collected 2D body images having a highest body direction score is then selected as the 2D body direction image for that body direction, as in 608. For example, if twenty 2D body images are collected and body direction scores computed by a CNN trained for front view body directions, the 2D body image with a highest body direction score, as determined by the CNN, is selected as the 2D body direction image for the front view body direction.

Finally, the selected 2D body direction image is sent to remote computing resources for processing to generate 3D body model parameters, as in 610, and the example process 600 completes, as in 612. While the illustrated example sends 2D body direction images upon selection, in some implementations, the selected 2D body direction images may remain on the portable device and be sent to the remote computing resources by the example process 400 (FIG. 4) once all 2D body direction images have been selected.

Figure 7:
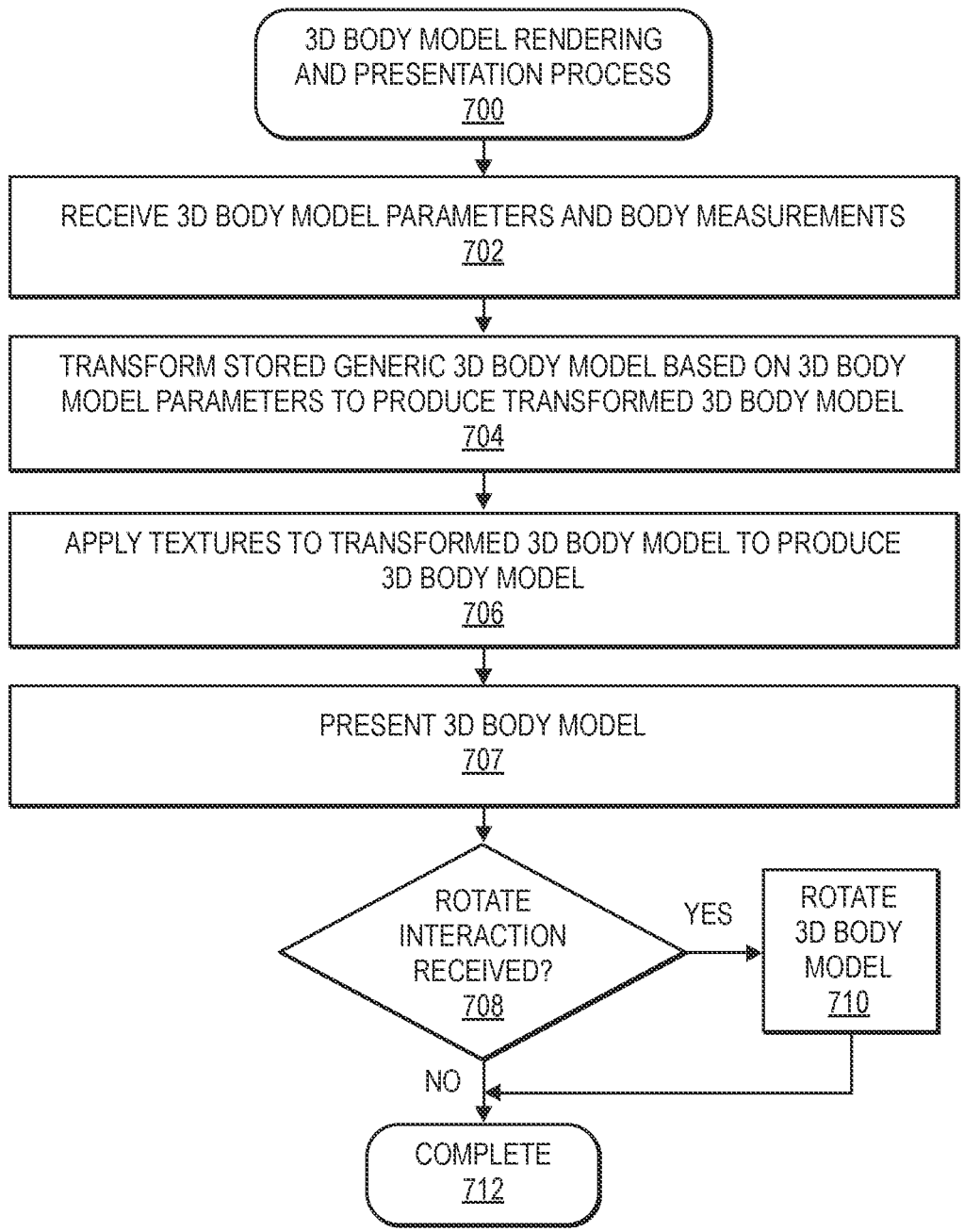
FIG. 7 is an example three-dimensional body model rendering and presentation process, in accordance with implementations of the present disclosure.

FIG. 7 is an example 3D body model rendering and presentation process 700, in accordance with implementations of the present disclosure.

Like example process 400 (FIG. 4), 500 (FIG. 5), and 600 (FIG. 6), the example process 700 may be performed by the application executing on the portable device, by an application executing remote computing resources, or a portion of the example process 700 may be performed on a portable device while another portion is performed on remote computing resources. The example process 700 begins upon receipt of 3D body model parameters and body measurements, as in 702. As discussed above, the 3D body model parameters and body measurements may be generated by remote computing resources, generated by one or more processes executing on the portable device, and/or generated through a combination of remote computing resources and the portable device. Likewise, as discussed above, and as further discussed in co-pending U.S. patent application Ser. No. 16/454,523, filed Jun. 27, 2019 and titled "THREE-DIMENSIONAL BODY COMPOSITION FROM TWO-DIMENSIONAL IMAGES," the contents of which are incorporated herein by reference, remote computing resources utilize one or more 2D body direction images to generate 3D body model parameters and/or body measurements. The 3D body model parameters and/or body measurements are then sent to the application executing on the portable device.

Utilizing the 3D body model parameters and body measurements, the application executing on the portable device transforms a stored generic 3D body model that is maintained or stored on the portable device to produce a transformed 3D body model, as in 704. In some implementations, the 3D body model parameters may include information, such as a floating point array that defines the shape of the 3D body that may be used for rendering the dimensionally accurate 3D body model. In addition, the 3D body model parameters may also include texture (e.g., skin color, hair, patterns, etc.) and/or other information that may be rendered onto the 3D body model to more accurately reflect the body of the user and/or clothing on the body of the user.

In some implementations, the application may maintain generic 3D body models for both male and female genders. Based on the information included in the 3D body model parameters, the application selects one of the generic 3D body models and transforms the selected generic 3D body model according to the 3D body model parameters to produce a transformed 3D body model that is a dimensionally accurate representation of the body. In addition, in some implementations, texture information (e.g., skin color, clothing, hair, patterns, etc.) included in the 3D body model parameters may be applied to the transformed 3D body model to produce a dimensionally accurate and visually similar 3D body model that is representative of the body, as in 706.

The application, through use of 3D acceleration libraries renders and presents the 3D body model such that a user may view and interact with the 3D body model, as in 707. In some implementations, as discussed above, one or more body measurements (e.g., weight, body fat, etc.) may also be presented.

After the 3D body model is rendered and presented, a determination is made as to whether a rotate user interaction with the 3D body model has been received, as in 708. If an interaction is received that is a request to rotate the 3D body model, the application rotates the 3D body model in accordance with the interaction, as in 710. For example, if the user input is a request to rotate the 3D body model clockwise, the application, using the 3D acceleration libraries, rotates the 3D body model clockwise.

If it is determined that a rotate interaction has not been received, or after rotating the 3D body model, the example process 700 completes.

Figure 8:
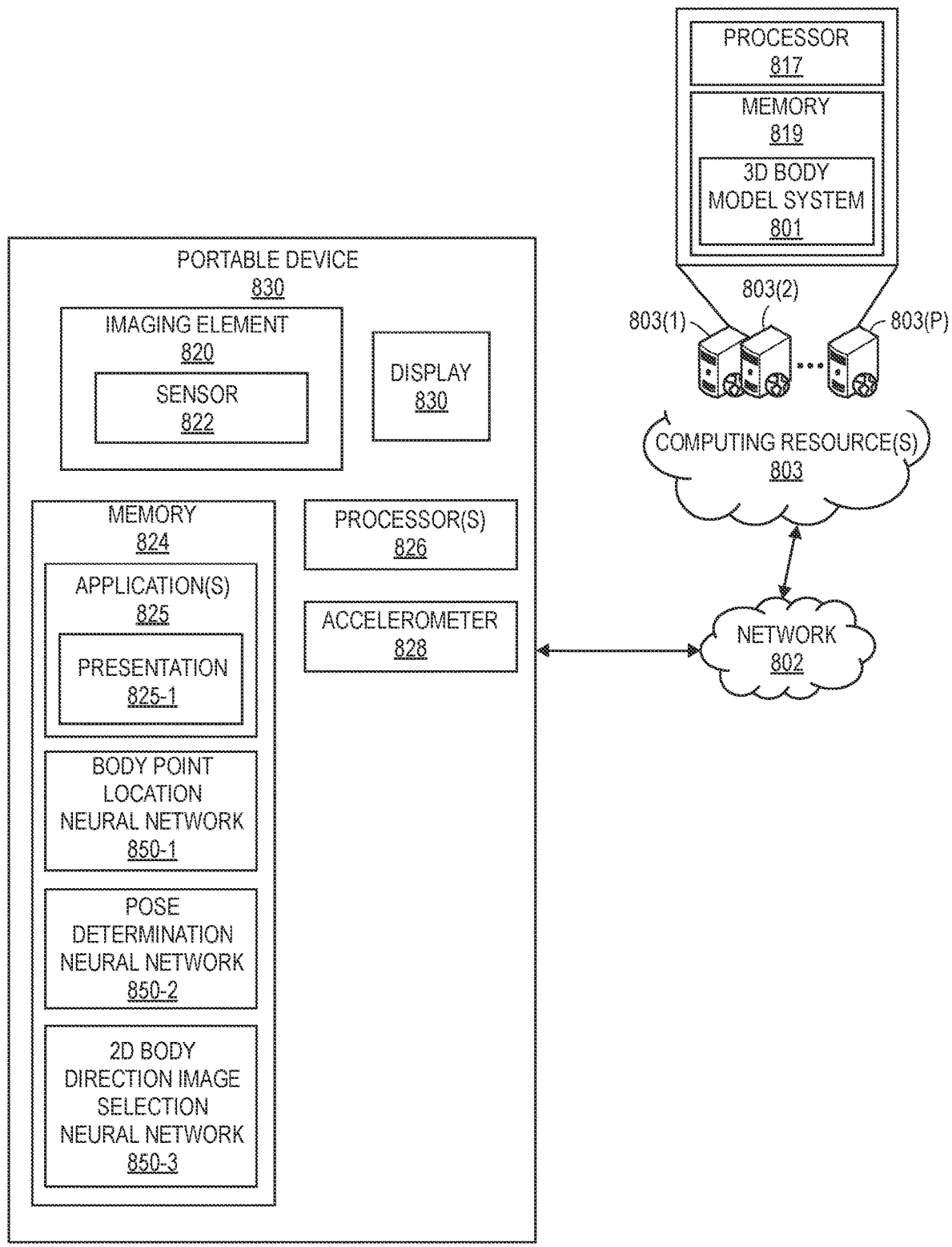
FIG. 8 is a block diagram of example components of a portable device and remote computing resources, in accordance with implementations of the present disclosure.

FIG. 8 is a block diagram of example components of a portable device 830 and remote computing resources 803, in accordance with implementations of the present disclosure.

As illustrated, the portable device may be any portable device 830 such as a tablet, cellular phone, laptop, wearable, etc. The imaging element 820 of the portable device 830 may comprise any form of optical recording sensor 822 or device that may be used to photograph or otherwise record information or data regarding a body of the user, or for any other purpose. As is shown in FIG. 8, the portable device 830 is connected to the network 802 and includes one or more memory 824 or storage components (e.g., a database or another data store), one or more processors 826, an accelerometer 828 or other position/orientation/angle determining component, an output, such as a display 830, speaker, haptic output, etc., and any other components that may be required in order to capture, analyze and/or store and/or transmit imaging data, such as the 2D body images discussed herein and/or to receive 3D body model parameters and/or body measurements and to render and present a 3D body model. For example, the imaging element 820 may capture one or more still or moving images. The portable device 830 may also connect to or otherwise communicate with the network 802 through the sending and receiving of digital data.

The portable device 830 may be used in any location and any environment to generate 2D body images that represent a body of the user. In some implementations, the portable device may be positioned such that it is stationary and approximately vertical (within approximately ten-degrees of vertical) and the user may position their body within a field of view of the imaging element 820 of the portable device at different directions so that the imaging element 820 of the portable device may generate 2D body images that include a representation of the body of the user from different directions, also referred to herein as 2D body direction images.

The portable device 830 may also include one or more applications 825, such as presentation application 825-1, stored in memory that may be executed by the one or more processors 826 of the portable device to cause the processor of the portable device to perform various functions or actions. For example, when executed, the application 825 may provide instructions to a user regarding placement of the portable device, positioning of the body of the user within the field of view of the imaging element 820 of the portable device, pose of the body, direction of the body, etc. Likewise, in some implementations, the presentation application 825-1 may present a 3D body model, generated from the 2D body images in accordance with the described implementations, to the user and allow the user to interact with the 3D body model. For example, a user may rotate the 3D body model to view different angles of the 3D body model, obtain approximately accurate measurements of the body of the user from the dimensions of the 3D body model, view body measurements, such as body fat, body mass, volume, etc.

The application may also include or communicate with one or more neural networks, such as a body point location neural network 850-1, pose determination neural network 850-2, and/or a 2D body direction image selection neural network 850-3, that are maintained in the memory 824 of the portable device 830 and executed by the one or more processors 826 of the portable device 830. As discussed above, the body point location neural network may receive one or more 2D body image from the imaging element 820, process those images and generate, for each received image, a heat map indicating predicted body point locations. The pose determination neural network 850-2 may receive as inputs the heat map produced by the body point location neural network 850-1 and further process that heat map to determine whether the body represented in the 2D body image is in a defined pose, such as an A Pose. The 2D body direction image selection neural network 850-3 may also receive the heat map and/or the 2D body images and further process that information to determine body direction confidence scores for a plurality of 2D body images and to select a 2D body image as the 2D body direction image for a determined body direction.

Machine learning tools, such as artificial neural networks, have been utilized to identify relations between respective elements of apparently unrelated sets of data. An artificial neural network, such as CNN, is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in image processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive one or more inputs and generate one or more outputs in accordance with an activation or energy function, with parameters corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a CNN, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with a label, a category, a cluster or a pseudolabel thereof, to within an acceptable tolerance, an input and/or multiple inputs, in the form of an image, features, known traits corresponding to the image, etc., may be provided to the trained network, and an output generated therefrom. For example, one of the neural network discussed above may receive as inputs a 2D body direction image. The trained neural network may then produce as outputs the probability that the body is a particular body direction. As another example, one of the neural network discussed above may receive as inputs the 2D body direction image and generate as outputs a heat map indicating for each x, y coordinate of the heat map a probability that the coordinate corresponds to a body point of the body represented in the 2D body direction image.

Returning to FIG. 8, the application 825, upon selection of a 2D body direction image by the 2D body direction image selection neural network 850-3 may send, via the network 802, the selected 2D body direction image to the computing resources 803 for processing by the 3D body model system 801.

Generally, the 3D body model system 801 includes computing resource(s) 803. The computing resource(s) 803 are separate from the portable device 830. Likewise, the computing resource(s) 803 may be configured to communicate over the network 802 with the portable device 830 and/or other external computing resources, data stores, etc.

As illustrated, the computing resource(s) 803 may be remote from the portable device 830 and implemented as one or more servers 803(1), 803(2), . . . , 803(P) and may, in some instances, form a portion of a network-accessible computing platform implemented as a computing infrastructure of processors, storage, software, data access, and so forth that is maintained and accessible by components/devices of the 3D body model system 801 and/or the portable device 830 via the network 802, such as an intranet (e.g., local area network), the Internet, etc. The computing resources 803, which may include one or more neural network, may process one or more 2D body direction images representative of a body of a user, generate therefrom 3D body model parameters and/or body measurements, and send those 3D body model parameters and/or body measurements to the portable device 830.

The computing resource(s) 803 do not require end-user knowledge of the physical location and configuration of the system that delivers the services. Common expressions associated for these remote computing resource(s) 803 include "on-demand computing," "software as a service (SaaS)," "platform computing," "network-accessible platform," "cloud services," "data centers," and so forth. Each of the servers 803(1)-(P) include a processor 817 and memory 819, which may store or otherwise have access to an 3D body model system 801.

The network 802 may be any wired network, wireless network, or combination thereof, and may comprise the Internet in whole or in part. In addition, the network 802 may be a personal area network, local area network, wide area network, cable network, satellite network, cellular telephone network, or combination thereof. The network 802 may also be a publicly accessible network of linked networks, possibly operated by various distinct parties, such as the Internet. In some implementations, the network 802 may be a private or semi-private network, such as a corporate or university intranet. The network 802 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, 3D body model, body measurements, and/or any other aspect of the present disclosure.

The 3D body model system 801, the application 825, and/or the portable device 830 may use any web-enabled or Internet applications or features, or any other client-server applications or features including E-mail or other messaging techniques, to connect to the network 802, or to communicate with one another, such as through short or multimedia messaging service (SMS or MMS) text messages. For example, the servers 803-1, 803-2 . . . 803-P may be adapted to transmit information or data in the form of synchronous or asynchronous messages from the 3D body model system 801 to the processor 826 or other components of the portable device 830, or any other computer device in real time or in near-real time, or in one or more offline processes, via the network 802. Those of ordinary skill in the pertinent art would recognize that the 3D body model system 801 may operate any of a number of computing devices that are capable of communicating over the network, including but not limited to set-top boxes, personal digital assistants, digital media players, web pads, laptop computers, desktop computers, electronic book readers, cellular phones, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 803-1, 803-2 . . . 803-P, the processor 826, or any other computers or control systems utilized by the application 825, the 3D body model system 801, and/or the portable device 830, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Additionally, in accordance with the present disclosure, the training of machine learning tools (e.g., artificial neural networks or other classifiers) and the use of the trained machine learning tools to detect body pose, determine body point locations, determined body direction, and/or to generate 3D body models of a body based on one or more 2D body images of that body may occur on multiple, distributed computing devices, or on a single computing device, as described herein.

Likewise, while the above discussions focus primarily on a 3D body model of a body being generated from multiple 2D body direction images, in some implementations, the 3D body model may be generated based on a single 2D body direction image of the body. In other implementations, two or more 2D direction body images may be used with the disclosed implementations. Likewise, a single 2D body direction image, such as a front view image, may be used to determine body measurements. In general, the more 2D body direction images, the more accurate the final representation and dimensions of the 3D body model may be.

Still further, while the above implementations are described with respect generating 3D body models of human bodies represented in 2D body images, in other implementations, non-human bodies, such as dogs, cats, or other animals may be modeled in 3D based on 2D images of those bodies. Accordingly, the use of a human body in the disclosed implementations should not be considered limiting.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4 through 7 or the transition diagrams shown in FIGS. 1A and 1B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    processing at least one two-dimensional ("2D") body image of a plurality of 2D body images of a body to determine body point locations for each of a plurality of body points of the body;
    determining, based at least in part on two or more of the body point locations, an angle of a body part;
    based at least in part on determining that the angle of the body part is within a defined range, determining that the body is positioned in a defined pose;
    subsequent to determining that the body is positioned in the defined pose, processing at least one of the plurality of 2D body images to determine a body direction of the body;
    in response to determining the body direction of the body, selecting a first image from the plurality of 2D body images as a 2D body direction image of the body in the body direction;
    generating, based at least in part on the 2D body direction image, a three-dimensional ("3D") body model parameters, wherein the 3D body model parameters are determined based at least in part on the 2D body direction image;
    rendering, based at least in part on the 3D body model parameters, a 3D body model representative of the body; and
    presenting the 3D body model.

2. The computer-implemented method of claim 1, further comprising:
    sending, from a device and to a computing resource, the 2D body direction image; and
    wherein generating the 3D body model parameters includes:
        generating, on the computing resource, the 3D body model parameters; and
        sending from the computing resource to the device, the 3D body model parameters.

3. The computer-implemented method of claim 1, further comprising:
    generating, based at least in part on the 2D body direction image, a body measurement.

4. The computer-implemented method of claim 1, wherein processing at least one of the plurality of 2D body images further includes:
    determining a first distance between a first ankle point location and a second ankle point location of the body;
    determining a second distance between a first hip point location and a second hip point location of the body;
    determining a difference between the first distance and the second distance; and
    determining, based at least in part on the difference, that a separation of the first ankle point location and the second ankle point location is within a first range.

5. The computer-implemented method of claim 1, wherein processing at least one of the plurality of 2D body images further includes:
    determining an angle of an arm of the body based at least in part on a shoulder point location and a wrist point location; and
    determining, based at least in part on the angle, that the angle of the arm of the body is within the defined range.

6. The computer-implemented method of claim 1, wherein rendering the 3D body model includes:
    transforming, based at least in part on the 3D body model parameters, a stored generic 3D body model to produce a transformed 3D body model that is a dimensionally accurate representation of the body; and
    applying a texture, indicated in the 3D body model parameters, to the transformed 3D body model to produce the 3D body model.

7. A system, comprising:
    a computing resource operable to at least:
        receive one or more two-dimensional ("2D") body direction images of a body; and
        generate, based at least in part on the one or more 2D body direction images, three-dimensional ("3D") body model parameters corresponding to the body; and
    an application stored on a memory of a device that includes an imaging element, wherein the application, when executed by one or more processors of the device, causes the one or more processors to at least:
        process one or more of a plurality of two-dimensional ("2D") body images generated by the imaging element to at least:
            determine body point locations for each of a plurality of body points of the body represented in the one or more 2D body images;

determine, based at least in part on two or more of the body point locations, a first angle of a body part of the body; and determine that the first angle of the body part is within a defined range; and based at least in part on a determination that the first angle is within the defined range, determine that the body is positioned in a defined pose;

in response to determination that the body is positioned in the defined pose:

process at least one of the plurality of 2D body images to determine a first direction of the body;

select a first 2D body image of the plurality of 2D body images as a first 2D body direction image corresponding to the first direction of the body;

send, to the computing resource, at least the first 2D body direction image;

receive, from the computing resource, the 3D body model parameters corresponding to the body represented in at least the first 2D body direction image; and present, with an output of the device and based at least in part on the 3D body model parameters, a 3D body model representative of the body.

8. The system of claim 7, wherein the computing resource is further operable to at least:

determine, based at least in part on one or more of the one or more 2D body images, one or more body measurements of the body, wherein the one or more body measurements include one or more of a weight, a visual body fat, a bone mass, a body mass, a body volume, an arm length, a leg length, an arm circumference, a leg circumference, a shoulder width, a shoulder circumference, a waist width, a waist circumference, a torso width, a torso circumference, or a body height.

9. The system of claim 7, wherein:

the application, when executed by the one or more processors, further causes the one or more processors to at least:

receive one or more body measurements as an input, wherein at least one of the one or more body measurements includes a height of the body; and send, to the computing resource, the one or more body measurements; and the computing resource is further operable to at least:

generate, based at least in part on the first 2D body direction image and the one or more body measurements, the 3D body model parameters.

10. The system of claim 7, wherein the application, when executed by the one or more processors, further causes the one or more processors to at least:

determine that a second 2D body direction image of the body in a second direction with respect to the imaging element is to be obtained;

present a request that the body rotate to the second direction;

process one or more of a second plurality of 2D body images generated to determine that the body is in the second direction;

select a second 2D body image from the second plurality of 2D body images as the second 2D body direction image corresponding to the second direction; and send, to the computing resource, at least the second 2D body direction image; and wherein the computing resource is further operable to at least, generate, based at least in part on the first 2D body direction image and the second 2D body direction image, the 3D body model parameters.

11. The system of claim 7, wherein the application, when executed by the one or more processors to process the one or more 2D body images, further causes the one or more processors to at least:

process the one or more of the plurality of 2D body images using a neural network to determine a direction score indicative of a confidence that the body is in the first direction with respect to the imaging element; and determine that the direction score exceeds a threshold.

12. The system of claim 7, wherein the application, when executed by the one or more processors to cause the one or more processors to process the one or more of the plurality of 2D body images, further causes the one or more processors to at least:

form a bounding box that encompasses each body point location; and determine, based at least in part on a size of the bounding box, that the body is at a correct distance from the imaging element.

13. The system of claim 7, wherein the application, when executed by the one or more processors, further causes the one or more processors to at least:

generate, based at least in part on the 3D body model parameters, the 3D body model representative of the body.

14. The system of claim 13, wherein the application, when executed by the one or more processors to generate the 3D body model, further causes the one or more processors to at least:

apply a texture to the 3D body model.

15. A method comprising:

processing at least a first two-dimensional ("2D") body image of a plurality of 2D body images received from an imaging element to at least:

determine body point locations for each of a plurality of body points of a body represented in the first 2D body image;

determine, based at least in part on two or more of the body point locations, an angle of a body part of the body; and determine that the angle of the body part is within a defined range; and based at least in part on determining that the angle of the body part is within the defined range, determining that the body is positioned in a defined pose;

in response to determining that the body is positioned in the defined pose:

determining a first direction of the body represented in the first 2D body image; and selecting at least a second 2D body image from the plurality of 2D body images as a first 2D body direction image corresponding to the body in the first direction; and generating, based at least in part on the first 2D body direction image, 3D body model parameters representative of the body.

16. The method of claim 15, further comprising:

rendering, based at least in part on the 3D body model parameters, a 3D body model representative of the body; and presenting the 3D body model.

17. The method of claim 16, wherein rendering the 3D body model includes:

applying a texture to the 3D body model to produce the 3D body model such that the 3D body model is a visually similar and a dimensionally accurate representation of the body.

18. The method of claim 15, wherein:
at least processing at least the first 2D body image is performed by a first device; and
at least generating the 3D body model parameters is performed by a computing resource that is separate from the first device.

19. The method of claim 15, further comprising:
determining a focal point of the imaging element based at least in part on a position of the body within a field of view of the imaging element; and
adjusting an exposure of the imaging element based at least in part on a lighting of the body within the field of view of the imaging element.

20. The method of claim 15, further comprising:
processing at least a third 2D body image to determine a second direction of the body with respect to the imaging element, wherein the second direction is different than the first direction; and
selecting the third 2D body image or a fourth 2D body image as a second 2D body direction image corresponding to the body in the second direction; and
wherein generating the 3D body model parameters is further based at least in part on the second 2D body direction image.

* * * * *